US007807727B2

(12) United States Patent
De Feraudy et al.

(10) Patent No.: US 7,807,727 B2
(45) Date of Patent: *Oct. 5, 2010

(54) SELECTIVE SEPARATION OF USED FRAGMENTED POLYMERIC MATERIALS BY USING A DYNAMICALLY STABILIZED DENSE AQUEOUS SUSPENSION

(75) Inventors: Hugues De Feraudy, Charentay (FR); Henri Seinera, Oullins (FR)

(73) Assignee: Galloo Plastics, Halluin (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/582,545

(22) PCT Filed: Dec. 8, 2004

(86) PCT No.: PCT/FR2004/003150

§ 371 (c)(1),
(2), (4) Date: Apr. 26, 2007

(87) PCT Pub. No.: WO2005/065830

PCT Pub. Date: Jul. 21, 2005

(65) Prior Publication Data

US 2007/0272597 A1    Nov. 29, 2007

(30) Foreign Application Priority Data

Dec. 10, 2003    (FR)    ................................. 03 14472

(51) Int. Cl.
*C08J 11/04*    (2006.01)

(52) U.S. Cl. ........................ 521/40; 521/40.5; 521/41; 521/46; 521/47.5; 521/48; 528/480; 528/502 R; 528/502 A; 241/19; 241/22; 209/132; 209/142; 209/162; 209/172.5; 209/724

(58) Field of Classification Search .............. 209/172.5, 209/3.1, 155, 724, 132, 142, 162; 521/48.5, 521/40, 40.5, 41, 48, 41.5, 42, 46, 46.5, 47; 528/480, 488, 489, 491, 502 R, 502 A; 241/19, 241/20, 22

See application file for complete search history.

(56) References Cited

U.S. PATENT DOCUMENTS 3,857,489 A    12/1974    Valentyik et al.

(Continued)

FOREIGN PATENT DOCUMENTS

DE    4334570    4/1995

(Continued)

OTHER PUBLICATIONS

Dreiringer et al, "Wiederaufbereitungs-Anlage Fuer PVC-Folien", KunststoffBerater, KunststoffVerlag. Isemhagen, DE, vol. 38, No. 6, Jun. 1, 1993, p. 26-30.

*Primary Examiner*—Ling-Siu Choi
*Assistant Examiner*—Frances Tischler
(74) *Attorney, Agent, or Firm*—Baker Donelson Bearman, Caldwell & Berkowitz, PC

(57) ABSTRACT

The invention relates to a method for selectively separating mixed synthetic organic materials such as filled or non-filled polymers and/or copolymers that are wastes, particularly used, for recycling in order to upgrade them. These synthetic organic materials result from the destruction by crushing of automobiles and durable consumer goods that have reached the end of their serviceable lives. Said selective separation method acts by separating these materials with regard to a density threshold selected in a dense medium consisting of separating fluid liquid suspensions composed of powdery particles dispersed in an aqueous phase. These suspensions are stabilized by using a dynamic stabilizing means at a density threshold value selected for causing the selective separation of a determined fraction from the mixture of the used materials to be separated.

34 Claims, 2 Drawing Sheets

U.S. PATENT DOCUMENTS

| | | | | |
|---|---|---|---|---|
| 4,504,643 A | * | 3/1985 | Boutin et al. | 526/287 |
| 5,653,867 A | | 8/1997 | Bassam et al. | |
| 5,738,222 A | | 4/1998 | Allies et al. | |
| 6,335,376 B1 | | 1/2002 | Arola et al. | |
| 6,460,788 B1 | * | 10/2002 | de Feraudy | 241/19 |
| 2003/0027877 A1 | | 2/2003 | Pomykala et al. | |

FOREIGN PATENT DOCUMENTS

| | | |
|---|---|---|
| DE | 19964175 | 12/2001 |
| EP | 0918606 | 6/1999 |
| WO | WO 2004/009200 | 1/2004 |

* cited by examiner

SELECTIVE SEPARATION OF USED FRAGMENTED POLYMERIC MATERIALS BY USING A DYNAMICALLY STABILIZED DENSE AQUEOUS SUSPENSION

CROSS REFERENCE TO RELATED APPLICATIONS

This application is a §371 National Stage Application of International Application No. PCT/FR04/03150 filed Dec. 8, 2004 which claims priority to French Application No. 0314472 filed Dec. 10, 2003.

BACKGROUND OF THE INVENTION

1. Field of the Invention

The invention relates to a method for selective separation of mixed synthetic organic materials, such as filled or unfilled, flameproof or non-flameproof, admixed or non-admixed polymers and/or copolymers that are waste materials to be recycled for upgrading, which synthetic organic materials can result from the destruction by grinding of automobiles and durable consumer goods that have reached the end of their serviceable lives, which selective separation method acts by separating these materials with regard to a density threshold selected in a dense medium consisting of fluid separating liquid suspensions, composed of powdery particles dispersed in an aqueous phase, wherein said suspensions are dynamically stabilised at the density threshold value selected for causing the selective separation of a predetermined fraction from the mixture of the used materials to be separated.

2. Description of Related Art

The used synthetic organic materials concerned generally come from the residues produced by grinding of automobiles and durable consumer goods that have reached the end of their serviceable life, in which many types of synthetic organic materials, such as filled or unfilled, flameproof or non-flameproof, admixed or non-admixed polymers and/or copolymers should be considered to be capable of being upgraded and in which many other materials are considered to be harmful contaminants, such as metals, minerals and other various contaminants that must first be removed. Other wastes, such as mixed industrial waste containing synthetic organic materials and packaging wastes such as polymers and/or copolymers from municipal collections and also containing mixed polymer materials can also be considered to be potentially upgradeable.

In industries for recycling used synthetic organic materials to be upgraded, various methods are used to separate stream constituents, substantially toxic and substantially contaminated, with a substantial content of upgradeable synthetic organic materials that must be separated from the pollutants, concentrated and sorted into homogenous streams of types of synthetic organic materials present, such as, for example, polyethylene, polypropylene, polystyrene (PS), acrylonitrile-butadiene-styrene copolymer (ABS), polyamides (PA), polyvinyl chloride (PVC), polyesters, polyurethane, polycarbonate, acrylic or metacrylic copolymers or the like, and all polymers capable of being filled, admixed, flameproofed or not.

These known methods currently make it possible to extract and separate streams to be treated, consisting of mixtures of synthetic organic materials to be upgraded and contaminants to be eliminated, which streams include:

a synthetic organic material phase having a density of less than 1, a synthetic organic material phase having a density equal to or greater than 1, a synthetic organic material phase, consisting, for example, of foams of polyethylene, polyurethane, waste from films, wires and the like, a contaminant phase to be eliminated of which the constituents cannot be upgraded using such separation and upgrading methods, for example, sand, glass debris, wood debris, metal scraps and the like.

One of these methods for separating polymer materials of all types from the grinding of automobiles and/or other end-of-life objects (described in the European patent EP 0918606 B), consists, after a grinding step causing the fragmentation of synthetic organic materials, preferably of performing mechanical separation by shape factor, followed by a first density separation step that causes the separation of all of the synthetic organic materials to be upgraded into two streams:

one having a density of less than 1, including in particular, and for example, unfilled polyolefins, such as polyethylenes (d=0.92 to 0.95), polypropylenes (around 0.9), ethylene and vinyl acetate copolymers, ethylene-propylene rubber copolymers (EPR), ethylene-propyene-diene-monomer copolymers (EPDM), polyethylene foams (PE), polypropylene (PP), polyurethane (PU) and the like, the other having a density greater than or equal to 1, including, and for example:

polystyrene: unfilled PS (around 1.05)

acrylonitrile-butadiene-styrene copolymers: unfilled ABS (around 1.07)

polyvinyl chlorides: rigid unfilled PVC (around 1.30 to 1.40) and filled (around 1.40 to 1.55), plasticized such as plastisol and PVC foams polycarbonates: unfilled PC, having a density d=1.20 to 1.24, PC filled with 20% glass fibres having a density d=1.3 or PC filled with 30% glass fibres having a density d=1.44 thermoplastic rubbers, except for alveolate thermosetting rubbers polyurethanes: filled PU (d=around 1.21)

Talc-filled polypropylenes (Talc PP filled with between 5% and 40% talc)

filled polyethylenes: (PE filled with between 2% and 40% fillers)

unsaturated polyesters (ranging from around 1.10 to 1.13)

saturated polyesters (d≧1.20), filled or not (often filled with glass fibres)

polyamides: $PA_6$ (d=1.13), $PA_{6.6}$ (d=1.14), $PA_{6.10}$ (d=1.08), $PA_{11}$ (d=1.04), $PA_{12}$ (d=1.02), filled or unfilled polymethyl methacrylates: PMMA (d=1.18)

others.

These two streams are subsequently treated so as to extract each component therefrom, separate them into homogeneous streams and treat them to make formulated pellets that can be used directly in plastic processing.

Although the stream of the upgradeable synthetic organic material mixture having a density of less than 1 is efficiently treated with a series of separation steps in an aqueous medium, in baths having a suitable density allowing for a fine selection of the various polymer compounds present in said flow, the same does not apply to the stream of the organic material mixture having a density greater than or equal to 1 of which the various synthetic organic materials are difficult to separate.

Indeed, for this second stream, which consists of a polymer mixture and/or filled or unfilled copolymers, of which the densities range from 1 to around 1.6, the separation of the various synthetic organic materials present in the mixture is performed by density in hydraulic separators of which the liquid separation medium consists of water, surfactants, and mineral compounds such as clay and in particular bentonite and optionally water-soluble compounds such as mineral salts, compounds implemented in order to increase the density of the liquid phase and bring it to a density value in principle enabling various synthetic organic materials to be separated into two distinct phases, one a supernatant and the other settled at the base of the separator, each phase forming a new stream, which is in turn subjected to another density separation process.

However, it appears that, during use, in particular in density separation facilities, used in industrial assemblies for processing used synthetic organic materials to be upgraded, the liquid separation media are not stable enough to allow for thorough selective density separations, i.e. providing highly homogenous separations into sorted material types, wherein the flows coming from the separation can be mixtures of a plurality of materials of which the respective densities are very similar to one another.

Indeed, a variety of particularly adverse phenomena occurring in this liquid density separation media have been observed; these adverse phenomena, which are real disadvantages, include:
- a change in the rheology of said liquid media, which is manifested by a disturbing variation in their viscosity toward a more fluid or pasty state,
- a deviation or a variation in the apparent density of the liquid media, which density cannot remain stable at the threshold level initially selected for good separation of the used synthetic organic materials to be upgraded, wherein the deviation (variation) causes a change in the composition of the flows separated by a dense liquid medium,
- settling over time of some of the mineral compounds dispersed in the aqueous medium for creating the selected density, partially causing the change in the density of the liquid separation medium,
- the near impossibility of finely separating the used synthetic organic materials to be upgraded, filled or not, when the density separation of the materials from one another must be performed on a density difference $\Delta=|0.001|$, i.e. in an interval around the selected density "ds" of "ds±0.005".

Therefore, there is a certain significant problem with regard to the very fine density separation of used synthetic materials to be upgraded such as filled or unfilled polymers and/or copolymers that are used wastes to be recycled, from the destruction by grinding of automobiles and durable consumer goods that have reached the end of their serviceable lives, so as to obtain homogenous streams of separated materials, without any deviation in the density and mixture of the selected materials.

Optimizing the separation of solid materials that are difficult to separate from one another, having a density of at least 1 and generally much higher, in a dense liquid medium, is the subject of numerous research and industrial application studies.

The dense liquid medium of the prior art, generally having a density greater than 1, consists of an aqueous phase in which:
- soluble mineral salts can be dissolved so as to increase the real density of the aqueous phase to a desired density value,
- powder clays can be dispersed so as to create a suspension having an apparent density until the desired density is reached,
- the two aforementioned means can be combined, that is, the solubilisation of salts increasing the density of the aqueous phase and the dispersion of clays in the aqueous phase at an increased density, so as to increase, insofar as possible, the stability of the suspension of clays in the densified aqueous phase.

In the case of ore processing, for example, the density methods used consist of separating the ore from their matrix, after a mechanical action of grinding with the liberation mesh, in an aqueous suspension of dispersed powder clay, which clay acts as a densifying agent, at the appropriate concentration to enable the components to be separated into two phases, one supernatant and the other settling.

However, at the clay concentrations used to prepare the densified separation suspensions, the stability of said suspensions is entirely relative because the clay concentrations can change over time, according to the in the composition of the matrix to be eliminated of which the density is not stable and varies according to the extraction zone as well as the density of the ore to be extracted.

In these methods, the density threshold selected for the separation is relatively coarse and normally cannot reach the first decimal digit in separation sensitivity, i.e. for example, a densified separation medium with an apparent density between 1.4 and 1.5.

In the case of used synthetic organic materials to be upgraded, for example, such as fragmented polymer materials to be separated from one another or to be separated from their pollutants, dense liquid media separation methods are carried out, using the solubilisation of mineral salts in the aqueous phase or the dispersion of powder clays in an adequate amount to establish the threshold density for the division in the presence of surfactants.

Some documents have described such dense liquid separation media. A first document (DE 19964175) describes a technology enabling a heterogeneous mixture of fragmented polymers to be separated, according to their apparent density, in an aqueous saline solution constituting the dense liquid medium having a predetermined density, wherein the separation takes place in a laminar flow requiring the optimization of the flow conditions of the aqueous saline solution and the mixture of polymer materials to be separated.

The method thus described appears to be suitable only for a single density value, as it appears to be difficult to change the density of the dense liquid medium according to a wide range of values, this change being associated with the fact that, to reach relatively high densities, it is necessary to use increasingly high concentrations of solubilised salts; this method can therefore have an unacceptable production cost for separating used synthetic organic materials to be upgraded, with a very low added value, and all the more so as the technology used is subjected to an obvious corrosive action due to the liquid saline medium.

Another document (U.S. Pat. No. 3,857,489) describes a method for separating a stream of materials to be separated in a dense aqueous medium consisting of a powder clay suspension, dispersed in water, with an improved stability due to the addition of a water-soluble heteropolysaccharide-type clay-stabilizing agent (surfactant) to the suspension. However, the stability of the separating suspension is not adequately achieved, a phenomenon in which the clay particles settle, causing a significant variation in the density threshold chosen for the selective separation.

Another document (EP 0918 606 B1), as mentioned above, describes a method for separating fragmented polymer materials, from the grinding of automobile vehicles and/or other objects at the end of their serviceable lives, on a flow consisting of a mixture of filled or unfilled polymer and/or copolymers, of which the densities range from 1 to 1.6, wherein the separation in a dense liquid medium uses a suspension made of powder clay dispersed in water, so as to obtain a medium separating by density at a chosen density threshold. However, as described above, such a separating suspension has disadvantages that are difficult to overcome such as a variation in the rheology, the density over time, settling of the powder clay and an inability to set a particularly fine density threshold, for example, at the second decimal digit and to maintain it there.

Another document (U.S. Pat. No. 6,335,376 B1) describes a method for separating polymers present in a mixture of various polymers containing no metals or pollutants to be removed such as glass, foam, wood or the like. The method claimed consists of heating the mixture of these various polymers after a size selection, so as to cause the bubbling of at least one of the polymers of said mixture to be separated and to separate it from said mixture by means of a change in the apparent density of said polymer, caused by the heating.

This change in the apparent density causes a differentiation between at least one of the polymers of the heated mixture and the other polymers of the mixture, and a selective separation by a series of steps in which the density of each polymer is altered.

Therefore, this method uses specific separation means implementing heating means that set off a change in the structure causing the polymer materials to be separated.

Another document, the article KUNSTSTOFFBERATER, KUNSTSTOFF VERLAG describes a plant specifically intended for the production of PVC sheets, so that the inlet stream contains 95 to 100% PVC-H and PCV-P and 0 to 5% impurity, including a grinder, a washer, and density separators. This method comprises two successive density separation steps performed in a hydrocyclone at a flow of 200 m$^3$/h, using a dense liquid medium which is an aqueous suspension of barium sulphate enabling the density of the water to be increased and the densities set as the separation threshold to be reached (d=1.2 and d=1.5).

However, this plant does not cause the separation of PVC-H (d=1.34 to 1.43) and PVC-P (d=1.20 to 1.35) from one another because the chosen separation density thresholds are such that they encompass the density values of PVC-H and PVC-P. Therefore, only the separation of the mixture of PVC-H and PVC-P with impurities occurs. Moreover, this plant does not allow for a particularly fine separation, because in the first separation at a density d=1.2, the products having a density of less than 1.2, such as polyolefins and wood, are supernatant. Products having a density greater than 1.2, which settle, constitute a mixture formed by PVC-H and PVC-P and impurities, which undergoes the second density separation at d=1.5. During this second separation step, the products having a density greater than 1.5, such as metals, glass and sand, settle and the mixture of PVC-H and PVC-P and probably some impurities having a density of between 1.2 and 1.5 is supernatant and recovered.

Thus, the prior art proposes various methods for separating materials to be separated, such as those resulting from the grinding of vehicles and/or durable consumer goods at the end of their serviceable lives, such as electrical household appliances, electronic equipment and the like which, after the recovery of metals, are synthetic organic materials, by implementing dense liquid media, with all of the disadvantages mentioned above.

However, the prior art does not propose methods for a particularly fine separation of various types of constituents, having a density equal to at least 1 and generally much higher than 1, forming a mixture of used synthetic organic materials to be upgraded, in a fragmented form.

OBJECTIVES OF THE INVENTION

The industrial problem presented upon the examination of the prior art and that still appears to be unsolvable by way of this prior art, is that of providing a method and a corresponding plant for fine separation by density difference by means of a dense liquid medium of complex mixtures of used synthetic organic materials of all types, to be separated according to type, each having a density equal to at least 1, in order to upgrade them by recycling, all of said materials being filled or unfilled, flameproof or non-flameproof, admixed or non-admixed thermoplastic or thermoset polymers and/or copolymers.

The following can be cited as examples: all thermoplastics such as polyolefins and olefin copolymers, PVC and derivatives, polystyrene and copolymers thereof, cellulose derivatives, polyamides, acrylic polymers and the like, as well as thermosetting plastics such as unsaturated polyesters, crosslinked polyurethanes, phenoplasts, aminoplasts, epoxide resins and the like and all special polymers such as polycarbonate, polyimides, linear polyurethanes, saturated polyesters, silicones, fluorinated polymers and the like, synthetic elastomers and the like, which organic products can be used alone or in a mixture, but can also be modified by mineral fillers, reinforcing fibres, flame retardants, shock absorbers, dyes, light or heat stabilisers, lubricants, antistatics, expanders and so on.

Therefore, the invention has many objectives so that the essential, or at least the obvious disadvantages of the prior art, can be eliminated.

A first objective of the invention is to create a method and its corresponding industrial plant making it possible to perform a selective separation of a mixture of synthetic organic materials, such as filled or unfilled, flameproof or non-flameproof, admixed or non-admixed polymers and/or copolymers of various types, which are waste materials to be recycled for upgrading, and result from the destruction by grinding of automobiles and durable consumer goods that have reached the end of their serviceable lives, by density at a density threshold "ds" chosen to cause their separation, which density separation takes place in a dense liquid medium formed by stable separating suspensions made up of powder particles dispersed in an aqueous phase.

Other objectives of the invention include the creation of a method and an industrial plant enabling the selective separation of the aforementioned materials to be performed by density, wherein:

the rheology of the separating suspensions remains stable and does not undergo a change manifested by fluidization or thickening of the dense liquid medium, the apparent density "ds" established for each separating suspension does not undergo any change due to destabilization of the suspension over time causing powder particles initially dispersed in a substantial amount to settle, substantially all at least of the powder particles actively and effectively participate in the creation of the apparent density of the separating suspension owing to their size homogeneity, without requiring the removal throughout the process of particles settling in the dense liquid medium because they are too large and therefore too heavy, the selective and fine separation of various synthetic organic materials constituting a mixture to be sorted of which the sorting sensitivity of a material with respect to another can have a differential of Δ=|0.001| or the value of the target density "ds" at ±0.0005.

SUMMARY OF THE INVENTION

According to the various objectives mentioned above, the method for selective density separation of used synthetic organic materials to be recycled for upgrading, having a density equal to at least 1, from the destruction by grinding of durable goods that have reached the end of their serviceable lives, such as automobile vehicles, electrical household appliances and electronic equipment, makes it possible to eliminate the disadvantages found in the prior art and to simultaneously bring substantial improvements to the means described in the prior art.

According to the invention, the method for selective separation of each of the constituents of a mixture of synthetic organic materials such as polymers and/or copolymers, in particular used and to be upgraded by recycling, having a density of at least 1, and in fragmented form, consisting of separating them by adding said mixture to a dense liquid medium, which is an aqueous suspension of powder particles dispersed in an adequate amount in an aqueous phase, in order to create a density level "ds" chosen as the threshold for separation of various fragmented synthetic organic materials to be separated selectively by type, characterised in that said separating suspension is rendered selective, stable and invariant with regard to density at a precision level of ±0.0005 with respect to the density threshold "ds" chosen for the selective separation:

a) by the size selection of powder particles having a granulometric cross-section of no more than 30 μm, preferably no more than 20 μm, and very preferably no more than 5 μm, which solid powder particles thus sized are dispersed and present in an aqueous phase in a sufficient amount to reach the chosen density threshold "ds", and b) by the implementation of at least one dynamic means of stabilisation by creating a circulating flow of said separating suspension, which circulating flow is at most 40 m$^3$/h.

DETAILED DESCRIPTION OF THE INVENTION

Figure 1:
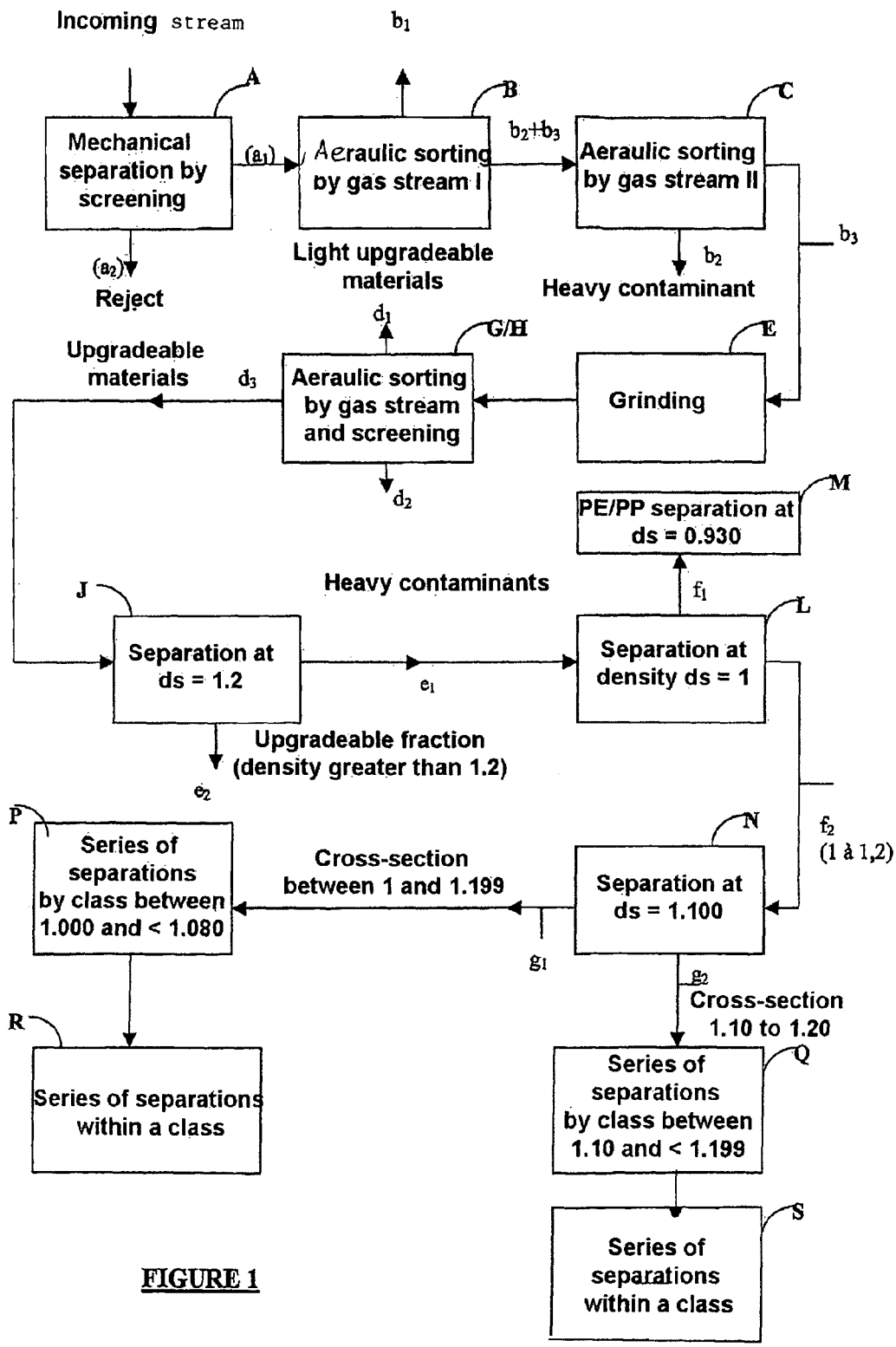
FIG. 1 illustrates the flow of method steps according to an exemplary embodiment of the disclosure.

The method for selective separation of a mixture of used synthetic organic materials applies to all mixed and fragmented, filled or unfilled, flameproof or non-flameproof, admixed or non-admixed polymers and/or copolymers to be upgraded, whether they are of thermoplastic and/or thermoset origin.

According to the method of the invention, the powder particles implemented in the formation of the aqueous suspension for fine separation of various types of synthetic organic materials, in particular used, to be upgraded, in the form of a mixture of fragmented materials, are chosen so that:

the rheology remains stable over time, i.e. free of any significant variation in its state to a more fluid or denser state, the apparent density "ds" chosen as the threshold for fine separation and extraction of a type of synthetic organic material to be extracted from the mixture of used materials containing it reaches and maintains this apparent density value "ds" with a precision targeted in the interval "ds±0.0005" thus conferring an extremely high sensitivity on the process for sorting by density from one material to another.

The powder particles implemented according to the invention can be natural or synthetic.

When the powder particles are natural, they can be chosen from the group of powder mineral materials consisting of clays, capable of forming a plastic suspension that is stable in contact with water, which can belong to the families constituted by the group of kaolinites, such as, for example, kaolinite, dickite, halloysite, disordered kaolinites, serpentines; the group of micas, such as, for example, muscovite, biotite and paragonite, pyrophyllite and talc, illites and glauconite; the group of montmorillonites, such as, for example, beidellite, stevensite, saponite and hectorite; the group of chlorites; the group of vermiculites; the group of interstratified clays of which the unitary structure is a combination of the previous groups; the group of fibrous clays, such as, for example, attapulgite (palygorskite) and sepiolite; or the group formed by calcium carbonate (calcite), magnesium carbonate, dolomite (double carbonate of calcium and magnesium), calcium sulphate dihydrate (gypsum), barium sulphate, talc, alumina, silica, titanium dioxide and zirconium.

When the powder particles are of synthetic origin, they can be chosen from the group consisting of glass powders, calcium carbonate precipitate and metallic powders.

To create the conditions for a stable suspension by dispersing them in the aqueous phase, said powder particles implemented according to the invention must have:

a granulometric cross-section of no more than 30 μm, preferably no more than 20 μm, and very preferably no more than 5 μm, a median diameter of no more than 5 μm and preferably in the interval ranging from 1 μm to 0.005 μm.

To further refine the separation threshold at the chosen density level "ds", it is possible to create a mixture of a plurality of granulometric cross-sections of a single powder compound such as calcium carbonate, or of more than one powder compound such as calcium carbonate and kaolin.

Similarly, to further refine the separation threshold at the chosen density level "ds", it is possible to use powder particles of which the diametral dimensions are primarily selected within the limits recommended in the context of the invention, by means of a selective sorting operation prior to implementation of the separation.

When the size characteristics of the powder particles exceed the limits mentioned above, i.e. when the powder particles have a granulometric cross-section greater than 30 μm, it appears to be clear that the dense separating suspensions obtained by their dispersion in the aqueous phase lead to the phenomena of settling, instability of characteristics and a change in the threshold "ds" targeted, to ensure the desired fine separation of the used synthetic organic materials.

In addition, the presence of the finest powder particles, i.e. having a granulometric cross-section of less than 5 μm, in a suspension in the aqueous phase, are absolutely essential to the invention because they balance and stabilise the larger particles having a maximum size of 30 μm present in said suspension.

Thus, the invention relates to powder particles in suspension in the aqueous phase having a full distribution of granulometric cross-sections, i.e. a granulometric cross-section ranging from 0 to 30 μm, enabling the finest particles having a granulometric cross-section of 0 to 5 μm to move into the empty spaces left between the largest particles having a granulometric cross-section of 5 to 30 μm and thus reinforce the stability and equilibrium of said suspension, in combination with the other means constituting the subject matter of the invention.

The weight of the powder particles dispersed in the aqueous phase is dependent on the density threshold "ds" chosen for the fine separation of a type of used polymer materials having a density generally greater than 1, from a mixture of used materials containing it.

To separate, for example, unfilled polystyrene (PS) having a density of 1.05, from an unfilled acrylonitrile-butadiene-styrene copolymer (ABS) having a density of 1.07, the amount of powder particles (ground $CaCo_3$) is 99 g per liter of aqueous phase in order to create a medium with a density for the fine separation of these two materials, which has a density "ds" exactly equal to 1.06.

According to the method of the invention, the aqueous phase is chosen from water having a conductivity that is preferably no more than 50 ms, more preferably chosen from water having a conductivity between 0.2 ms and 40 ms, provided that the unit for measuring conductivity is SIEMENS and that the measurements of the water used are clearly on the Siemens $10^{-3}$ scale, i.e. the millisiemens represented by ms.

The aqueous medium used can be selected from the group consisting of a wide variety of water types, such as spring water, water for human consumption, treated or untreated industrial water, circulating in a closed circuit or not, sea water, knowing that the stability of the suspension is acquired at the level of the threshold density "ds" chosen to perform a fine separation when the two criteria, which are the size of the powder particles dispersed in the aqueous phase and the implementation of dynamic means for stabilizing the suspension, are combined.

According to the invention, the dynamic stabilization of the characteristics of rheology and invariance in the chosen threshold density "ds" at a precision level of "ds ±0.0005" of the separating suspensions:

consisting of powder particles having a selected size, i.e. a granulometric cross-section of no more than 30 μm, preferably no more than 20 μm, and very preferably no more than 5 μm, these solid powder particles thus selectively sized being dispersed and present in the aqueous phase in a sufficient amount to reach the chosen density threshold "ds", are obtained by dynamic stabilization means for rendering said separating suspensions stable and invariant with regard to density at a density level "ds" chosen as the separation threshold for various fragmented synthetic organic materials to be selectively separated by type.

These dynamic stabilization means are selected from the group consisting of agitation by means of an agitation rotor, internal recirculation of the suspension by means of the agitation rotor, external recirculation of the suspension by means of a pump by withdrawing the suspension from the base of the container where it is located and by reinjection into the upper portion of said container, or by a combination of means enabling the agitation by means of an agitation rotor and internal and/or external recirculation of the suspension to be combined.

The external recirculation of the suspension by means of a pump for blending, and/or the internal recirculation by means of an agitation rotor of the stabilised suspension therein, is such that it does not cause any visible agitation phenomena, as the stable suspension of powder particles dispersed in the aqueous phase has an apparent static appearance so as not to disturb the density separation of the floating and settling flows of fragmented polymer materials during separation.

The conditions for dynamic stabilization of the separating suspension, according to the invention, are such that the circulating flow of the suspension moved by one and/or the other means to stabilise the suspension can vary according to the quantity of powder particles dispersed in the aqueous phase. This flow is at most 40 $m^3/h$, generally between 10 and 30 $m^3/h$, and preferably between 5 and 15 $m^3/h$.

Indeed, it is essential to control and manage the flow at a low value of no more than 40 $m^3/h$, because beyond such a limit, the dense suspension can no longer act as a separator, as said suspension becomes a mechanical carrier for the polymer fragments to be separated.

Thus, it is necessary to control and manage the flow at a low value of no more than 40 $m^3/h$ in order to maintain the density threshold "ds" at the chosen value and at a precision level of ±0.0005.

It is important to note that the recirculation of the suspension can be performed continuously or non-continuously, that is, sequentially: for example, circulation cycles of 20 s followed by pause cycles of 20 s.

The circulating flow of the separating suspension is adjusted at an hourly turnover rate of said suspension that generally ranges from 0.5 to 4 and preferably from 0.5 to 2.

A person skilled in the art is capable of defining the necessary flow for blending and maintaining the aqueous suspension of powder particles in this homogenous state so that said suspension is stable at the density level "ds" chosen as the threshold for separation of the fragmented synthetic organic materials, to be selectively separated according to type. For example, when the weight percent of dry matter of powder particles of an aqueous suspension of the invention is between 7.60% and 26.56%, the blending pump flow rate at the origin of the mechanical agitation can be on the order of 2 $m^3/h$.

Optionally, and according to the method of the invention, a water-soluble agent for assisting the means for dynamic stabilization of the rheological and invariance characteristics of the apparent density "ds" at a precision level of ±0.0005 with respect to said density "ds" of the solid powder particle suspension, and for reinforcement of these characteristics, can be implemented in said dispersed powder particle suspensions initially stabilised by dynamic stabilisation means.

This water-soluble agent can be chosen from the group consisting of known water-soluble stabilisation agents such as, for example, phosphates and polyphosphates, alkylphosphate esters, alkylphosphonate, alkylsulphate, and alkylsulfonate, which cause deflocculation of colloidal clays and make it possible to use a high-density and low-viscosity suspension, lignin, lignosulfonates in the form of calcium, sodium, iron, chromium, or iron and chromium salts, maleic anhydride and sulfonic styrene acid copolymers, substituted, neutralised, esterified or non-esterified methylacrylamide and (methyl)acrylic acid copolymers, methylacrylamide-alkyl sulfonic acid and (methyl)acrylic acid copolymers, water-soluble acrylic acid polymers used in acid form or, optionally, entirely or partially neutralised by alkaline and/or alkaline-earth agents, by amines and/or salified by monovalent and/or polyvalent ions, and/or esterified, or from water-soluble acrylic copolymers having a phosphatized, phosphonated, sulfated or sulfonated motif, water-soluble acrylic copolymers, of which only some are known, having the general formula:

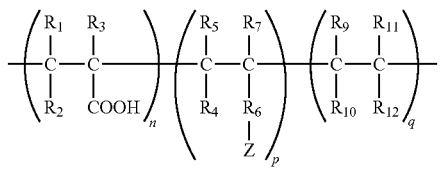

wherein:

Z is a phosphate, phosphonate, sulfate or sulfonate motif having at least one free acid function, any other acid function being capable of being occupied by a cation, an ammonium grouping, an amine, an alkyl in $C_1$ to $C_3$, a substituted or an unsubstituted aryl in $C_3$ to $C_6$, an alkylaryl, an ester in $C_1$ to $C_{12}$, preferably in $C_1$ to $C_3$, or a substituted amide, n has a value between 0 and 95, p has a value between 95 and 5, q has a value between 0 and 95, the sum of n+p+q being equal to 100, wherein n and q can separately be zero, $R_1$ and $R_2$ can simultaneously be hydrogen, or while one is hydrogen, the other can be a carboxylic function esterified or not by an alcohol in $C_1$ to $C_{12}$ and preferably in $C_1$ to $C_4$, $R_3$ can be hydrogen or an alkyl radical in $C_1$ to $C_{12}$ and preferably in $C_1$ to $C_4$, $R_4$ and $R_5$ can be, simultaneously or not, hydrogen or an alkyl radical in $C_1$ to $C_{12}$, preferably in $C_1$ to $C_4$, a substituted or unsubstituted aryl, a carboxylic function esterified or not by an alcohol in $C_1$ to $C_{12}$ and preferably in $C_1$ to $C_4$, $R_6$ is a radical that establishes the bond between the motif Z and the polymer chain, which radical $R_6$ can be an alkylene of formula $-(CH_2)_r-$ in which r can have the values in the interval 1 to 12, an alkylene oxide or polyoxide of formula $-(R_8-O)_s-$ in which $R_8$ is an alkylene in $C_1$ to $C_4$ and s can have a value from 1 to 30, or a combination of the two formulas $-(CH_2)_r-$ and $-(R_8-O)_s-$, $R_7$ can be hydrogen or an alkyl radical in $C_1$ to $C_{12}$ and preferably in $C_1$ to $C_4$, $R_9$ and $R_{10}$ can simultaneously be hydrogen, or while one is hydrogen, the other can be a carboxylic grouping, an ester in $C_1$ to $C_{12}$, preferably in $C_1$ to $C_3$, an alkyl in $C_1$ to $C_{12}$, preferably in $C_1$ to $C_3$, or an alkylaryl, $R_{11}$ can be hydrogen, a carboxylic grouping, an alkyl in $C_1$ to $C_3$ or a halogen, $R_{12}$ can be an ester in $C_1$ to $C_{12}$, preferably in $C_1$ to $C_5$, a substituted or unsubstituted amide, an alkyl in $C_1$ to $C_{12}$, preferably in $C_1$ to $C_5$, an aryl in $C_5$ or $C_6$, an alkylaryl, a halogen, a carboxylic grouping or a phosphatized, phosphorated, sulfated or sulfonated alkyl or aryl grouping.

The weight of the water-soluble stabilisation agent is expressed as a dry/dry weight percent of said agent with respect to the weight of the powder particles in suspension. This weight of said agent is between 0.02% and 5%, and preferably between 0.1% and 2% dry/dry with respect to the weight of the powder particles.

The water-soluble stabilisation agent is a copolymer of which the molecular weight is generally between 5000 and 100,000.

The water-soluble stabilisation agent is in the form of an aqueous solution of the copolymer that may be partially or entirely neutralised or not, by means of a neutralizing agent chosen, for example, from the group consisting, for example, of sodium, potassium, ammonium, calcium, magnesium, zinc and aluminium hydroxides, and primary, secondary or tertiary amines, aliphatic and/or cyclic, such as mono-, di- and tri-ethanolamines, mono- and diethylamines, cyclohexylamine and methylcyclohexylamine.

Therefore, the stability of the separating suspension is acquired at the level of the threshold density "ds" chosen for the fine separation when the three criteria including the sizing of the particles (a), the aqueous phase having a conductivity equal to at least 15 ms (b), and the dynamic stabilization means (c), are combined.

According to the invention, the preparation of stable suspensions of powder particles dispersed in an adequate amount in an aqueous phase in order to create a specific density level "ds" chosen as the threshold for separation of various fragmented used synthetic organic materials to be selectively separated, owing to the precision of the density of the separation medium, is performed under agitation by the controlled introduction of powder particles in a predetermined amount so as to reach the desired density threshold.

The stable powder particle suspensions according to the invention, allow for the fine and selective separation of various synthetic organic materials constituting a mixture to be sorted, wherein the sensitivity for sorting materials can have a differential $\Delta=|0.001|$, making it possible to effectively separate polymer materials, in particular used materials to be separated of which the densities are dispersed in an interval ranging from 1.000 to 1.600.

However, in the case of polymer materials, in particular used materials, having a density strictly identical but of a different chemical nature, other separation means involving other characteristics of said materials or other physicochemical behaviours must be implemented in order to achieve said selective separation.

According to the invention, the method is implemented in an industrial plant comprising at least one hydraulic separator equipped with at least one dynamic stabilisation means.

The term hydraulic separator is used to refer to separators of which the aqueous phase is apparently static or is a flow with a very low velocity, capable of being laminar.

If the industrial plant comprises a single hydraulic separator, it is possible to change the chosen density "ds":

so as to increase it, by a controlled addition of predefined and selected powder particles to the suspension present in the hydraulic separator, until the new chosen threshold density "ds" is reached, so as to decrease it, by adding water until the new chosen threshold density "ds" is reached.

The change in the density of the stable separating suspension, so as to increase or decrease it, is carried out under agitation by means of an agitation rotor and/or internal recirculation of the aqueous medium and/or recirculation of the dense medium by withdrawing the dense aqueous medium from the base of the hydraulic separator and reinjecting it into the top portion of said separator, during the adjustment and after the adjustment.

If the industrial plant comprises a plurality of hydraulic separators, the various separators are placed one after another, in a cascade system functioning with stable suspensions each having a specific density threshold "ds", in an increasing or decreasing order of density.

In the method according to the invention, the threshold density "ds" of the aqueous suspension for fine separation is continuously controlled by appropriate measurement means and subjected to an adjustment when any deviation is detected.

To do this, each hydraulic separator is controlled with regard to the density of the dense medium that it contains by means of two electrical valves each opening onto two circuits connected to two tanks. One of the tanks contains a "mother" suspension with a concentration of around 60% powder particles, maintained under agitation, and/or stabilised by a water-soluble stabilizing agent, enabling a predetermined amount of the mother suspension to be added, which adjusts upward any deviation toward a reduction in the density of the dense medium for fine separation.

The other tank contains water enabling a predetermined amount to be added so as to adjust downward any deviation toward in increase in the density of the dense medium for fine separation.

The measurement of the density of the dense medium of each hydraulic separator is performed continuously by suitable measuring apparatuses that activate the opening of one or the other of the electrical valves, then the closing thereof when the threshold density level "ds" is reached.

The method and recovery of the separated flows are carried out while a dynamic stabilization of each selective separation suspension is performed in each hydraulic separator by one and/or the other of the stabilisation means, such as the agitation by means of an agitation rotor, by internal recirculation of the suspension by means of an agitation rotor, by external recirculation of the suspension by withdrawing said suspension from the base of said separator and reinjecting it into the upper portion.

The hydraulic separators have separation capacities on the order of 1 to 10 tons per hour and run continuously. They can, however, run by campaign, making it possible to change the splitting density values and not to require a cascade of three or four hydraulic separators. In this case, the dense medium is customised for each separator with respect to the separation campaign to be performed.

EXAMPLE 1

Corresponds to FIG. 1

On a site for industrial grinding of electrical household appliances that have reached the end of their serviceable lives and after separation of most of the various metals to be recovered, a 21.88-ton stream of upgradeable materials from this separation consisting of a mixture of used synthetic polymers to be upgraded and contaminants to be eliminated is subjected to a preconcentration phase in order to select, from this mixture of used polymer materials to be upgraded, the used polymer materials to be upgraded having a density interval ranging from 1.000 to 1.400 to be treated according to the invention, wherein the lower bound is included and the upper bound is excluded.

The composition of the flow of materials entering the preconcentration phase is given in table I below.

TABLE I

| Materials | Composition and granulometry | Content in weight % |
|---|---|---|
| Polymers | PE, PP, PS, ABS, Talc PP, PVC, etc. | 73% by weight |

TABLE I-continued

| Materials | Composition and granulometry | Content in weight % |
|---|---|---|
|  | in fragmented form |  |
| Rubber and/or elastomers | All types of joints and/or insulating casings for electrical cables | 19% by weight |
| Metals | Fragments of ferrous, and especially non-ferrous, metals: copper, aluminium, etc. | 8% by weight |

The preconcentration is performed on the aforementioned stream, and consists of treating the mixture of materials from the grinding in fragmented form, so as to at least partially eliminate the materials contaminating the upgradeable materials. Said mixture to be treated includes:

a fraction of upgradeable materials, which are unexpanded synthetic polymer materials of various types and/or compositions and/or shape factors, in the form of fragments ranging from a rigid state to a soft state, fractions of contaminants consisting of metallic materials and or organic materials other than unexpanded polymer materials and/or expanded synthetic polymer materials, comprising the following treatment steps.

(a) A first step of mechanical separation in (A) by screening and/or shape factor so as to at least partially extract, from the fragmented material mixture, the fraction of contaminants. The screening meshes were 0-4 mm and 0.02 tons of contaminants, representing 0.09% by weight of the incoming stream, were removed.

(b) A step of aeraulic separation, by gas stream, comprising an inlet for the mixture of materials from step (a) and three outlets for the extraction of fractions of separated materials of which the first fraction ($b_1$) consists of a fraction of ultralight and/or expanded synthetic polymer materials, the second fraction ($b_2$) consists of a fraction of heavy materials present in the mixture and the third fraction ($b_3$) consists of a fraction of the synthetic polymer materials to be upgraded, in a fragmented form ranging from a rigid state to a soft state. To do this, the flow of materials from step (a), at least partially separated from the fraction of contaminants, was subjected to a separation by aeraulic sorting into two coupled separators (B) and (C).

In the first aeraulic separator (B), the fraction ($b_1$) representing 0.48 tons of so-called light materials to be treated by suction and fractions $b_2$ and $b_3$ extracted from the base of the aeraulic separator (B) and representing 21.38 tons of so-called heavy materials were collected in order to be treated in the aeraulic separator (C). The fraction ($b_1$) represents 2.19% by weight of light materials removed.

The mixture of fractions ($b_2$)+($b_3$) represents 97.71% by weight of heavy materials.

The mixture of fractions ($b_2$) and ($b_3$) representing 21.38 tons was placed in the second aeraulic sorting separator (C). The fraction ($b_2$) constituted by contaminants such as metals, representing a mass of 5.2 tons, was extracted from the base of the aeraulic separator (C).

The fraction ($b_3$), also extracted from the separator (C), constituted by upgradeable polymer materials, represents a mass of 16.18 tons, i.e. 73.95% by weight with respect to the mass of the flow introduced for preconcentration.

(c) A step of grinding the fraction ($b_3$) of polymer materials to be upgraded, from step (b), with the liberation mesh for separating contaminants included in, adhering to or assembled to the fragments of the fraction of polymer materials to be upgraded. This grinding step is carried out in the zone (E), and the grinding is performed on a 25-mm screen.

(d) A second step of aeraulic separation by gas stream in the zone (G/H) of the fraction of synthetic polymer materials to be upgraded, from the grinding step (c) for at least partially removing the fraction of contaminants liberated during the grinding and to extract the fraction of upgradeable materials constituting the desired mixture, preconcentrated in upgradeable materials, still containing contaminants. This aeraulic separation zone, which comprises not only a gas stream separation but also screening means is formed by a modular separation device sold by the WESTRUP company, for example.

From this aeraulic separation and screening zone (G/H):
a fraction ($d_3$) representing 15.8 tons of upgradeable synthetic polymer materials, essentially thermoplastics and a small amount of thermosetting plastics, was extracted in the form of flakes, chips and other ground material representing 72.2% by weight of the total mass of the flow entering the preconcentration phase,
a fraction ($d_2$) representing 0.06 tons of heavy contaminants formed by metals and electrical wire parts was removed by screening, representing 0.27% by weight of the total mass of the flow entering the preconcentration phase,
a fraction ($d_1$) representing 0.32 tons of material, also upgradeable, was separated by suction including residual polymer foams, fine rubbers, thermoplastic and thermosetting polymer materials, in flake powder or chip form, representing 1.46% by weight of the total mass of the flow entering the preconcentration phase.

Fraction $d_3$, a mixture of upgradeable used synthetic polymers leaving step (d), but having highly variable densities in an interval ranging from 0.900 to 1.400, is subjected to a density separation treatment in an aqueous medium, in zone (J), at a density threshold ds$\geq$1.2 in order to perform a first selection by density.

This separation is achieved by flotation at the chosen density threshold 1.2 in a dense medium consisting of an aqueous suspension of $CaCO_3$ powder dispersed in the aqueous phase and stabilised at the value ds=1.2 by means of recirculation of the suspension, withdrawn from the base of the separator and reinjected near the surface at a recirculation flow rate of 15 $m^3/h$.

The dense separation medium comprises:
an aqueous phase having a conductivity of 5.9 ms and a pH of 7.42,
calcium carbonate powder of which the median diametral dimension is 1 μm and of which the granulometric cross-section is 5 μm (OMYALITE 90 sold by the OMYA company), in an amount of 362 g/liter,
the stabilisation of the separating suspension is achieved by recirculating the calcium carbonate suspension at a rate of 15 $m^3/h$, the usable capacity of the hydraulic separator being 5 $m^3$.

This separation at the density threshold ds=1.2 enables two fractions to be obtained:
a first fraction $e_1$ having a density of less than 1.2, representing 14.52 tons of upgradeable material (66.36% by weight of the incoming stream), containing in particular polyethylene (PE), polypropylene (PP), flameproof or non-flameproof high-impact and/or crystal polystyrene (PS), flameproof or non-flameproof acrylonitrile-butadiene-styrene copolymer (ABS), polypropylene filled with 5% to 40% by weight of talc, and other polymer materials, and
another fraction $e_2$ having a density greater than or equal to 1.2, representing 1.28 tons of upgradeable material (5.85% by weight of the incoming stream), in the form of a mixture including polyvinyl chloride, filled unsaturated polyester, filled polyurethanes or the like.

Fraction $e_1$, a mixture of used polymers to be upgraded, leaving step (J), is subjected to a density separation treatment in an aqueous medium, in zone (L), at the density threshold ds=1.000, so as to extract a supernatant flow ($f_1$), which is a mixture of (PE) and (PP) and a running flow ($f_2$) including the other used polymers to be upgraded.

The supernatant flow ($f_1$), which represents 3.398 T [23.40% by weight of fraction (e)], is subjected to a density separation treatment in as hydroalcoholic medium (water and isopropanol) at the specific density threshold ds=0.930 making it possible to recover:
all of the supernatant polypropylene present (2.140 T), representing 14.74% by weight of the fraction el,
all of the flowing polyethylene present (1.257 T), representing 8.66% by weight of the fraction $e_1$,
which two used, finely separated polymer materials can be directly upgraded in the form of granules obtained by their extension.

The running flow ($f_2$), which represents 11.122 T [76.60% by weight of the fraction ($e_1$)], consisting of a mixture of unfilled flameproof or non-flameproof high-impact and/or crystal polystyrene, an unfilled acrylonitrile-butadiene-styrene copolymer, which for some fractions is flameproof, and polypropylene filled with 5% to 40% talc, constitutes the fraction of the used polymer materials, of which the densities are in an interval ranging from 1.000 to 1.199, bounds included, and which are to be separated according to the invention.

The fraction $f_2$, a mixture of upgradeable used synthetic polymers leaving the separator (L) is subjected to a density separation treatment in an aqueous medium, in zone (N), at a density threshold "ds"=1.100.

This separation is achieved by density at the chosen density threshold 1.100 in a dense medium consisting of an aqueous suspension of $CaCO_3$ powder dispersed in the aqueous phase and stabilised at the value ds=1.100 by means of recirculation of the suspension by pump at a rate of 15 $m^3/h$.

The dense separation medium comprises:
an aqueous phase having a conductivity of 5.9 ms and a pH of 7.42,
calcium carbonate powder of which the median diametral dimension is 1 μm and of which the granulometric cross-section is 5 μm (OMYALITE 90 sold by the OMYA company), in an amount of 187.7 g/liter,
and is stabilised by recirculation of the suspension by its withdrawal from the base of the separator and its hydraulic reinjection near the surface, at a recirculation flow rate of 15 $m^3/h$.

This separation at the density threshold ds=1.100 enables two fractions to be obtained:
a first fraction $g_1$ having a density of less than 1.100, representing 10.742 tons of upgradeable material (49.19% by weight of the incoming stream), containing in particular polystyrene (PS), acrylonitrile-butadiene-styrene copolymer (ABS), talc-filled polypropylene, and other polymer materials, and
another fraction $g_2$ having a density greater than or equal to 1.100, representing 0.38 tons of upgradeable material (1.74% by weight of the incoming flow), in the form of a mixture including polycarbonate (PC), talc-filled (30 to 40% talc) polypropylene (PP), polyvinyl chloride (PVC), polymethylmethacrylate (PMMA), filled polyurethanes, or the like.

The flow $g_1$ in fact consists of:
- a mixture of crystal or high-impact polystyrenes, treated or not so as to make them flameproof and/or admixed with various known agents. This is why the density intervals of these various polystyrenes is between 1.000 and 1.080,
- an acrylonitrile-butadiene-styrene copolymer mixture, of which the real density is determined by the relative amounts of the three monomers used, by any admixtures and by the flameproof treatments explaining the density interval of these various ABS, which is between 1.000 and 1.080 as well,
- a talc-filled polypropylene mixture of which the content by weight % of talc can range from 5% to 20%. This is why the density interval of the talc-filled polypropylene is also between 1.000 and 1.080.

This flow $g_1$ is then subjected to separation in zone (P) by increasing density class using a dense separation medium consisting of:
- an aqueous phase having a conductivity of 5.7 ms and a pH of 7.53,
- calcium carbonate powder having a median diametral dimension of 1 μm and of which the granulometric cross-section is 5 μm (OMYALITE 90 sold by the OMYA company), of which the weights for each density are shown in table II below,
- means for dynamic stabilisation by recirculation of a suspension volume, at a flow rate of 15 m³/h.

To do this, and in each known density class shown in table II, the supernatant phase is recovered and analysed, and the sinking phase is collected then subjected to a density higher than the previous one, thereby producing, for each class, an analysed supernatant phase and a sinking phase subjected in turn to a higher density.

flameproof. These various density classes are statistically justified by the presence of a plurality of PS families in this used polymer to be upgraded;
the ABS is also distributed among a plurality of density classes, but it is primarily present in the density interval [1.058-1.080[. In the case of ABS, there also appears to be a wide distribution of densities due to the presence of a plurality of types of ABS of which the compositions can vary by the relative amounts of their monomers and also by the presence of flameproof agents;
the talc PP is also distributed among a plurality of classes by significant variations in density due to the presence of the talc filler, which can range from 5% to 20% by weight.

To perform the effective separation of the PS, ABS and talc PP present in the same density class, the mixture of used polymer materials to be upgraded, extracted from each density class of table II, is subjected to a new separation by increasing or decreasing density in the separation zone (R) by means of a dense separation medium consisting of:
- an aqueous phase having a conductivity of 6.8 ms and a pH of 8.1,
- calcium carbonate powder having a median diametral dimension of 1 μm and of which the granulometric cross-section is 5 μm (OMYALITE 90 sold by the OMYA company), and of which the weights are shown in table III below,
- means for dynamic stabilisation by recirculation of a suspension volume, at a flow rate of 15 m³/h.

By way of example, two density separation classes only, from table II, are selected and treated according to the invention, to illustrate the selective separation capability of the method to establish stable separating suspensions with an invariant density, when the density level "ds" is created as the

TABLE II

Treatment of stream g1

| Density ds established as the separation threshold | CaCo₃ in g/l powder for creating ds | Limits of each density class | Stabilisation means: flow in m³/h | % by weight in each class | | |
|---|---|---|---|---|---|---|
| | | | | PS | ABS | talc PP |
| 1.020 | 32.30 | [1.000 to 1.020[ | 15 | 1.10% | 0.30% | 5.15% |
| 1.042 | 68.75 | [1.020 to 1.042[ | 15 | 22.00% | 0.10% | 16.40% |
| 1.050 | 82.20 | [1.042 to 1.050[ | 15 | 36.20% | 1.30% | 18.50% |
| 1.053 | 87.30 | [1.050 to 1.053[ | 15 | 10.20% | 3.10% | 7.95% |
| 1.055 | 90.70 | [1.053 to 1.055[ | 15 | 8.10% | 5.40% | 2.90% |
| 1.058 | 95.80 | [1.055 to 1.058[ | 15 | 3.50% | 6.50% | 5.50% |
| 1.060 | 99.20 | [1.058 to 1.060[ | 15 | 9.30% | 14.60% | 7.60% |
| 1.065 | 107.80 | [1.060 to 1.065[ | 15 | 6.10% | 17.30% | 9.10% |
| 1.070 | 116.50 | [1.065 to 1.070[ | 15 | 2.50% | 25.60% | 9.00% |
| 1.080 | 134.00 | [1.070 to 1.080[ | 15 | 1.00% | 24.60% | 17.50% |
| 1.090 | 151.70 | [1.080 to 1.090[ | 15 | 0% | 1.10% | 0.30% |
| 1.100 | 169.50 | [1.090 to 1.100[ | 15 | 0% | 0.10% | 0.10% |
| TOTAL | | | | 100.00% | 100.00% | 100.00% |

The amounts of $CaCO_3$ used in each density class are determined by measuring the density and can vary according to the purity of the $CaCO_3$ used.

As shown in table II,
the PS is primarily present in the density range [1.020-1.055[, constituting a first group related to the crystal PS, but a second density group is seen in the interval [1.055-1.070[ which is related to the high-impact PS, without failing to mention that some PSs present are probably threshold for the separation of various used polymer materials to be separated, wherein the precision level of the density is capable of having an absolute value |0.001|, i.e. is capable of having, near the chosen value "ds", a precision with respect to said "ds" value of ±0.0005.

However, it is noted that used polymers having a different chemical nature but exactly identical densities cannot be separated by the method of the invention and require other separation means based on other criteria.

The two density classes from table II, and treated according to the method of the invention, are the following: [1.042 to 1.050[ and [1.065 to 1.070[.

To do this, and in each known density class shown in table III, the supernatant phase is recovered and analysed, and the sinking phase is collected, then subjected to a density higher than the previous one, thereby producing, for each class, an analysed supernatant phase and a sinking phase subjected in turn to a higher density.

This highly-selective separation produced, for each class, the results shown by class in the following table III.

TABLE III

Treatment of two density classes from stream g1.

| Density ds established as the separation threshold | CaCo$_3$ in g/l powder for creating ds | Limits of each density class | % by weight in each class | | |
|---|---|---|---|---|---|
| | | | PS | ABS | talc PP |
| 1.043 | 70.40 | [1.042 to 1.043[ | 0 | 0 | 0.32 |
| 1.044 | 72.80 | [1.043 to 1.044[ | 0 | 0 | 0.35 |
| 1.045 | 74.50 | [1.044 to 1.045[ | 0 | 0 | 0.52 |
| 1.046 | 76.20 | [1.045 to 1.046[ | 0 | 0 | 0.49 |
| 1.047 | 77.20 | [1.046 to 1.047[ | 0 | 0 | 0.32 |
| 1.048 | 78.80 | [1.047 to 1.048[ | 0 | 0 | 0.55 |
| 1.049 | 80.50 | [1.048 to 1.049[ | 6.5 | 0 | 4 |
| 1.050 | 82.20 | [1.049 to 1.050[ | 15.5 | 0.1 | 9.85 |
| 1.066 | 109.60 | [1.065 to 1.066[ | 0.92 | 0.08 | 6.67 |
| 1.067 | 113.30 | [1.066 to 1.067[ | 0.75 | 0.28 | 0.85 |
| 1.068 | 113.00 | [1.067 to 1.068[ | 1.05 | 0.78 | 0.69 |
| 1.069 | 114.70 | [1.068 to 1.069[ | 2.14 | 5.8 | 0.52 |
| 1.070 | 116.50 | [1.069 to 1.070[ | 1.24 | 10.36 | 0.37 |

As table III shows, the method according to the invention provides excellent control in the selective density separation of the polymer materials present, with a density separation sensitivity of ±0.0005 with respect to the chosen density threshold "ds".

However, polymer materials having the same density but a different composition are present in the initial industrial mixture treated in this example, so that other separation means must be implemented in order to separate, within each fraction of polymers having an identical density, each type of polymer present.

The other fraction $g_2$ having a density greater than 1.100, representing 0.38 tons of upgradeable material including a mixture of polycarbonate (PC), talc-filled polypropylene (PP), polyvinyl chloride (PVC), polymethyl methacrylates (PMMA) and filled polyurethanes (PU), is treated according to the same principle as fraction $g_1$, in separation zones (Q) and (S), not described.

EXAMPLE 2

Figure 2:
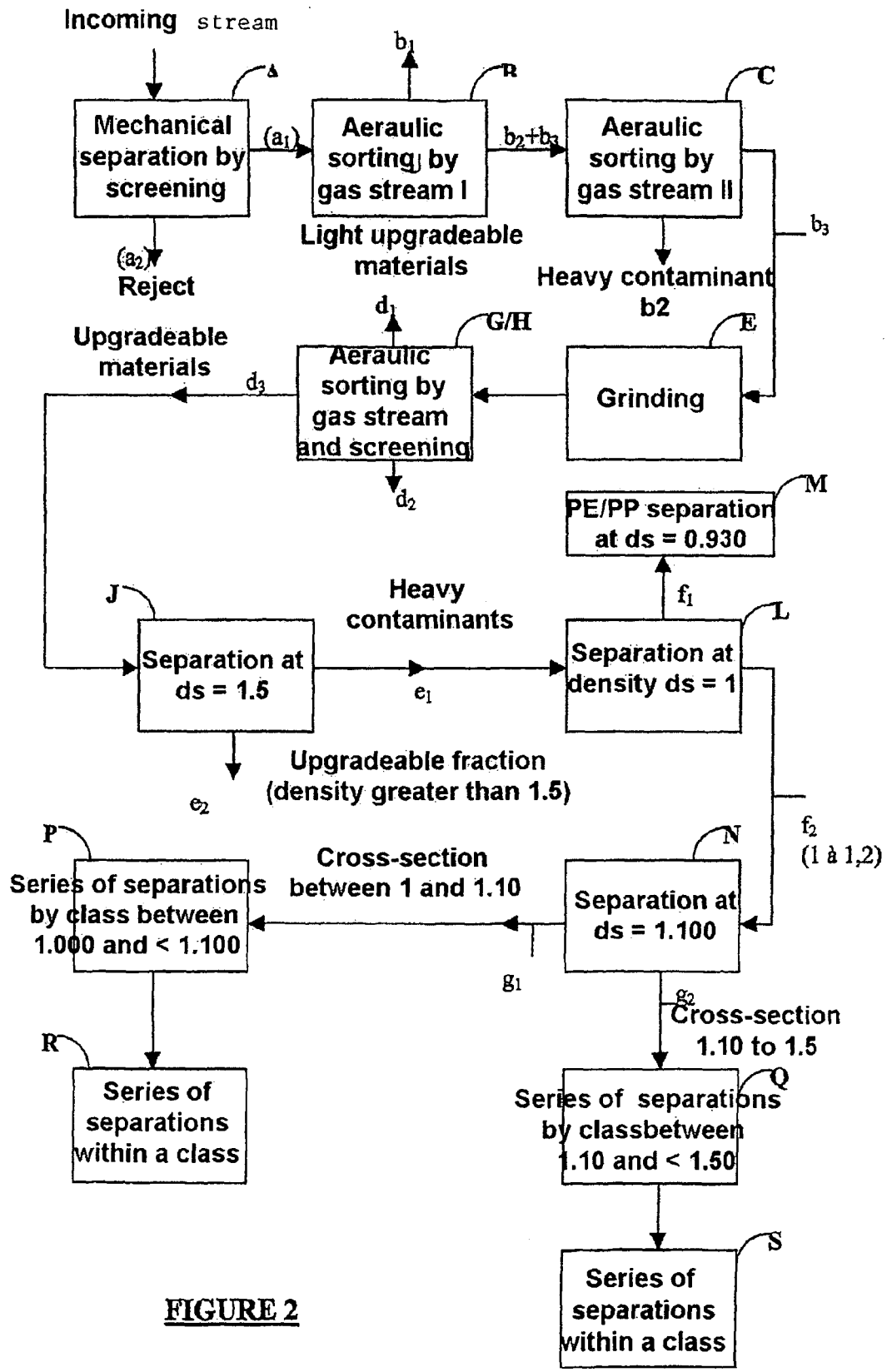
FIG. 2 illustrates the flow of method steps according to an exemplary embodiment of the disclosure.

Corresponds to FIG. 2

On a site for industrial grinding of automobiles that have reached the end of their serviceable lives and after separation of most of the various metals to be recovered, a 26.820-ton stream of upgradeable materials from this separation consisting of a mixture of used synthetic polymers to be upgraded and contaminants to be eliminated is subjected to a preconcentration phase as described in example 1 in order to select, from this mixture of used polymer materials to be upgraded, the used polymer materials to be upgraded having a density interval ranging from 1.000 to 1.600 to be treated according to the invention, wherein the lower bound is included and the upper bound is excluded, so as to enable the polyvinyl chloride (PVC) to be recovered.

The composition of the stream of materials entering the preconcentration phase is given in table IV below.

TABLE IV

| Materials | Composition and granulometry | Content in weight % |
|---|---|---|
| Polymers | PE, PP, PS, ABS, Talc PP, PVC, etc. in fragmented form | 43% by weight |
| Rubber and/or elastomers | All types of joints and/ or insulating casings for electrical cables, tires, etc. | 48% by weight |
| Metals | Fragments of ferrous, and especially non-ferrous, metals: copper, aluminium, etc. | 9% by weight |

The preconcentration is performed on the aforementioned stream, and consists of treating the mixture of materials from the grinding in fragmented form, so as to at least partially eliminate the materials contaminating the upgradeable materials. Said mixture to be treated includes:
  a fraction of upgradeable materials, which are unexpanded synthetic polymer materials of various types and/or compositions and/or shape factors, in the form of fragments ranging from a rigid state to a soft state,
  fractions of contaminants consisting of metallic materials and or organic materials other than unexpanded polymer materials and/or expanded synthetic polymer materials, comprising the following treatment steps as described in example 1:
  (a) A first step of mechanical separation in (A) by screening and/or shape factor so as to at least partially extract, from the fragmented material mixture, the fraction of contaminants. The screening meshes were 0-4 mm and 0.228 tons of contaminants, representing 0.85% by weight of the incoming stream, were removed.
  (b) A step of aeraulic separation, by gas stream, of the mixture of materials from step (a) into two coupled separators (B) and (C). In the first aeraulic separator (B), the fraction ($b_1$) representing 0.483 tons of so-called light materials was treated by suction and fractions $b_2$ and $b_3$ extracted from the base of the aeraulic separator (B) and representing 26.109 tons of so-called heavy materials were collected in order to be treated in the aeraulic separator (C). The fraction ($b_1$) represents 1.80% by weight of light materials removed.

The mixture of fractions $(b_2)+(b_3)$ represents 97.35% by weight of heavy materials.

The mixture of fractions $(b_2)$ and $(b_3)$ representing 26.109 tons was placed in the second aeraulic sorting separator (C). The fraction $(b_2)$ constituted by contaminants such as metals, representing a mass of 14.550 tons, was extracted from the base of the aeraulic separator (C), i.e. 54.25% of the incoming mass.

The fraction $(b_3)$, also extracted from the separator (C), constituted by upgradeable polymer materials, represents a mass of 11.559 tons, i.e. 43.10% by weight with respect to the mass of the stream introduced for preconcentration.

(c) A step of grinding in zone (E) on a 25-mm screen of the fraction $(b_3)$ of polymer materials to be upgraded, from step (b), with the liberation mesh for separating contaminants included in, adhering to or assembled to the fragments of the fraction of polymer materials to be upgraded.

(d) A second step of aeraulic separation by gas stream in the zone (G/H) of the fraction of synthetic polymer materials to be upgraded, from the grinding step (c). This aeraulic separation zone comprises not only a gas stream separation but also screening means (for example, a modular separation device of the WESTRUP company).

From this aeraulic separation and screening zone (H):

a fraction $(d_1)$ representing 5.900 tons of material, also upgradeable, was separated by suction including residual polymer foams, fine rubbers, thermoplastic and thermosetting polymer materials, in the form of flake powder or chips, representing 22.00% by weight of the total mass of the stream entering the preconcentration phase, a fraction $(d_2)$ representing 0.122 tons of heavy contaminants formed by metals and electrical wire parts, inter alia, was removed by screening, representing 0.46% by weight of the total mass of the stream entering the preconcentration phase, a fraction $(d_3)$ representing 5.537 tons of upgradeable synthetic polymer materials, essentially thermoplastics and a small amount of thermosetting plastics, was extracted in the form of flakes, chips and other ground material representing 20.65% by weight of the total mass of the stream entering the preconcentration phase.

Fraction $d_3$, a mixture of upgradeable used synthetic polymers leaving step (d), but having highly variable densities in an interval ranging from 0.900 to 1.600, is subjected to a density separation treatment in an aqueous medium, in zone (J), at a density threshold $ds \geq 1.500$ in order to perform a first selection by density.

This separation is achieved by density at the chosen density threshold 1.500 in a dense medium consisting of an aqueous suspension of $CaCO_3$ powder dispersed in the aqueous phase and stabilised at the value $ds=1.5$ by recirculation of said aqueous suspension at a rate of 15 m³/h, the usable capacity of the hydraulic separator being 5 m³.

The dense separation medium comprises:

an aqueous phase having a conductivity of 6.0 ms and a pH of 7.50, calcium carbonate powder of which the median diametral dimension is 1 μm and of which the granulometric cross-section is 5 μm (OMYALITE 90 sold by the OMYA company), in an amount of 1132 g/liter, This separation at the density threshold $ds=1.5$ enables two fractions to be obtained:

a first fraction $e_1$ having a density of less than 1.5, representing 4.983 tons of upgradeable material (18.58% by weight of the incoming stream), containing in particular polyethylene (PE), polypropylene (PP), flameproof or non-flameproof high-impact and/or crystal polystyrene (PS), unfilled flameproof or non-flameproof acrylonitrile-butadiene-styrene copolymer (ABS), polypropylene filled with 5% to 40% by weight of talc, unfilled polyvinyl chlorides (PVC) and the like, and another fraction $e_2$ having a density greater than or equal to 1.5, representing 0.554 tons of upgradeable material (2.06% by weight of the incoming stream), in the form of a mixture including filled polyvinyl chloride, filled polyurethanes or the like.

The fraction $e_1$, a mixture of used polymers to be upgraded, leaving step (J), is subjected to a density separation treatment in an aqueous medium, in zone (L), at the density threshold $ds=1.000$, so as to extract a supernatant flow $(f_1)$, which is a mixture of (PE) and (PP) and a running flow $(f_2)$ including the other used polymers to be upgraded.

The supernatant flow $(f_1)$, which represents 2.199 T, i.e. 8.2 by weight of fraction $(e_1)$, is subjected to a density separation treatment in a hydroalcoholic medium (water and isopropanol):

at the specific density threshold $ds=0.930$ making it possible to recover:

all of the supernatant polypropylene present, representing 28.68% by weight of the fraction $e_1$ (1.429 T), all of the flowing polyethylene present, representing 15.45% by weight of the fraction $e_1$ (0.770 T), which two used, finely separated polymer materials can be directly upgraded in the form of granules obtained by their extrusion.

The running flow $(f_2)$, which represents 2.784 T. i.e. 55.87% by weight of the fraction $(e_1)$, consisting of a mixture of unfilled flameproof or non-flameproof high-impact and/or crystal polystyrene, an unfilled acrylonitrile-butadiene-styrene copolymer, which for some fractions is flameproof, unfilled polyvinyl chlorides, and polypropylene filled with 5% to 40% talc, constitutes the fraction of the used polymer materials, of which the densities are in an interval ranging from 1.000 to 1.500, bounds included, and which are to be separated according to the invention.

The fraction $f_2$, a mixture of upgradeable used synthetic polymers leaving the separator (L) is subjected to a density separation treatment in an aqueous medium, in zone (N), at a density threshold "ds"=1.100, so as to separate and collect some of the PS, ABS and talc PP.

This separation is achieved by density at the chosen density threshold 1.100 in a dense medium consisting of an aqueous suspension of $CaCO_3$ powder dispersed in the aqueous phase and stabilised at the value $ds=1.100$ by means of recirculation of said suspension at a rate of 15 m³/h (usable capacity of the hydraulic separator: 5 m³).

The dense separation medium comprises:

an aqueous phase having a conductivity of 6 ms and a pH of 7.5, calcium carbonate powder of which the median diametral dimension is 1 μm and of which the granulometric cross-section is 5 μm (OMYALITE 90 sold by the OMYA company), in an amount of 169.5 g/liter.

This separation at the density threshold $ds=1.100$ enables two fractions to be obtained:

a first fraction $g_1$ having a density of less than 1.100, representing 1.824 tons of upgradeable material (6.99% by weight of the incoming stream), containing in particular polystyrene (PS), acrylonitrile-butadiene-styrene copolymer (ABS), talc-filled polypropylene, and other polymer materials, which is treated according to the treatment used in example 1, for this fraction in the separation series (P) and (R), and another fraction $g_2$ having a density greater than or equal to 1.100, representing 0.960 tons of upgradeable material (3.58% by weight of the incoming stream), in the form of a mixture including polyvinyl chloride (PVC), talc-filled (more than 20% by weight) polypropylene, polystyrene and a filled and/or flameproof acrylonitrile-butadiene-styrene copolymer (ABS), filled polyurethane (PU), filled polyethylene (PE), and others, which is treated in order to upgrade each of the polymers and more specifically the PVC.

The stream $g_2$ is in fact essentially constituted by PVC. This stream $g_2$ is thus introduced into the series of separators (Q) by density class created in the interval [1.100 to 1.500[, where it is subjected to separation by increasing density class by means of a dense separation medium consisting of:

an aqueous phase having a conductivity of 6 ms and a pH of 7.5, calcium carbonate powder having a median diametral dimension of 1 μm and of which the granulometric cross-section is 5 μm (OMYALITE 90 sold by the OMYA company), of which the weights for each density are shown in table V below.

To do this, and in each known density class shown in table V, the supernatant phase is recovered and analysed, and the sinking phase is collected then subjected to a density higher than the previous one, thereby producing, for each class, an analysed supernatant phase and a sinking phase subjected in turn to a higher density.

similar to others in terms of density, a synthetic mixture was prepared, having the following composition by weight, summarised in table VI:

TABLE VI

| | | Synthetic mixtures | |
|---|---|---|---|
| Polymer | Measured density | Kilograms added | weight % |
| Ethylene-propylene copolymer | 0.900 | 450 | 45 |
| Polystyrene | 1.050 | 200 | 20 |
| 20% talc-filled ethylene-propylene copolymer | 1.060 | 150 | 15 |
| Acrylonitrile-butadiene-styrene copolymer | 1.070 | 100 | 10 |
| Polyamide 6 | 1.13 | 40 | 4 |
| Polyvinyl chloride | 1.38 | 60 | 6 |
| Total | | 1000 | 100% |

This mixture is subjected to a density separation treatment in a dense liquid medium consisting of an aqueous suspension of $CaCO_3$ powder dispersed in the aqueous phase and stabilised at the chosen density threshold by dynamic stabilisation means.

The dense separation medium consists of:

an aqueous phase having a conductivity of 6 ms and a pH of 7.5,

TABLE V

| Density ds established as the separation threshold | CaCo$_3$ in g/l powder for creating ds | Limits of each density class | weight % in each class | Distribution of polymers in each class | | | | | | |
|---|---|---|---|---|---|---|---|---|---|---|
| | | | | PS | ABS | talc PP | PP | PE | Others | PVC |
| | | <1.000 | 44.13% | 0 | 0 | 0 | 29.13 | 15.00 | 0 | 0 |
| 1.000 | 0.00 | [1.000-1.100[ | 36.59% | 20.49 | 9.88 | 6.22 | 0 | 0 | 0 | 0 |
| 1.100 | 169.5 | [1.100-1.350[ | 10.10% | 0.66 | 2.12 | 3.86 | 0 | 0 | 3.06 | 0.40 |
| 1.350 | 700.0 | [1.350-1.400[ | 1.10% | 0 | 0 | 0 | 0 | 0 | 0.95 | 0.15 |
| 1.400 | 834.5 | [1.400-1.450[ | 1.30% | 0 | 0 | 0 | 0 | 0 | 0.78 | 0.52 |
| 1.450 | 977.0 | >1.450 | 6.78% | 0 | 0 | 0 | 0 | 0 | 4.41 | 2.37 |
| TOTAL | | | 100% | 21.15 | 12.00 | 10.08 | 29.13 | 15.00 | 9.20 | 3.44 |

As shown in table V, the method of the invention provides excellent control in the selective density separation of the polymer materials present, with a density separation sensitivity of ±0.0005 with respect to the chosen density threshold "ds".

However, polymer materials having the same density but a different composition are present in the initial industrial mixture treated in this example, so that other separation means must be implemented in particular in the series of separators (S) in order to separate, for each fraction of polymers having an identical density, each type of polymer present.

EXAMPLE 3

To confirm the capability of the method according to the invention for selective separation in a dense liquid medium of constituents of a mixture of synthetic organic materials which are polymers of different types, but some of which are very calcium carbonate powder having a median diametral dimension of 1 μm and of which the granulometric cross-section is 5 μm (OMYALITE 90® sold by the OMYA company), in amounts in g/l needed to create increasing density values "ds" of the dense medium, from the initial value ds=1.000 to the value ds=1.200 in order to ensure the selective separation, the stabilisation of the aqueous suspension of $CaCO_3$ powder dispersed in the aqueous phase, at the chosen density value "ds" is obtained by recirculation of said suspension under low agitation by means of an agitation rotor, at a rate of 15 m$^3$/h.

The selective separation is thus performed with increasing density thresholds "ds" making it possible to obtain, for each density threshold "ds", two polymer fractions, one supernatant with a density below "ds", and the other sinking with a density greater than "ds". All of the information concerning these selective separations is provided in the following table VII:

TABLE VII

| Density ds established as separation threshold | CaCO₃ powder in g/l to create ds | Types and amounts of polymers selectively separated | % of polymers recovered with respect to initial synthetic mixture |
|---|---|---|---|
| 1.00 | 0.00 | 447.7 kg of copolymer (E/P) | 99.5 |
| 1.055 | 90.70 | 198.2 kg of PS | 99.1 |
| 1.065 | 107.80 | 148.8 kg of copolymer (E/P) with 20% talc | 99.2 |
| 1.075 | 125.20 | 99.0 kg of ABS | 99.0 |
| 1.200 | 361.60 | 38.8 kg of PA6 | 97.0 |
| >1200 |  | 59.0 kg of rigid PVC | 98.3 |

As can be noted, the selective separation of the various polymers present in the initial synthetic mixture by increasing density class of an aqueous suspension of $CaCO_3$ is precise and efficient, since each polymer present in the initial mixture is selectively extracted for each density threshold "ds" chosen to do this, without any movement of one or the other polymer into neighbouring classes, each selective separation class having functioned with an excellent prediction and containing only the polymer selected.

With respect to the total mass of the initial synthetic mixture (1000 kg), the loss of polymers during the selective separation according to the method of the invention is 8.5 kg, i.e. 0.99% by weight.

EXAMPLE 4

Corresponds to FIG. 1

On the same site as that of example 1, for industrial grinding of electrical household appliances that have reached the end of their serviceable lives and after separation of most of the various metals to be recovered, a 22.4-ton stream of upgradeable materials from this separation consisting of a mixture of used synthetic polymers to be upgraded and contaminants is subjected to a preconcentration phase in order to extract, from this mixture, the used polymer materials to be upgraded having a density interval ranging from 1.000 to 1.200 to be treated according to the invention.

The composition of the flow of materials entering the preconcentration phase is given in table VIII below.

TABLE VIII

| Materials | Composition ground with a 25-mm screen | Content in weight % |
|---|---|---|
| Polymers | PE, PP, PS, ABS, Talc PP, PVC, etc. in fragmented form | 65% by weight |
| Rubber and/or elastomers | All types of joints and/or insulating casings for electrical cables | 29% by weight |
| Metals | Fragments of ferrous, and especially non-ferrous, metals: copper, aluminium, etc. | 6% by weight |

The preconcentration is carried out according to example 1 from the aforementioned mixture including:

a fraction of upgradeable materials, which are unexpanded synthetic polymer materials of various types and/or compositions and/or shape factors, in the form of fragments ranging from a rigid state to a soft state, fractions of contaminants consisting of metallic materials and or organic materials other than unexpanded polymer materials and/or expanded synthetic polymer materials, comprising the treatment steps a) to d) of example 1.

(a) In the first step of mechanical separation in (A) by screening and/or shape factor, 0.04 tons of contaminants, representing 0.18% by weight of the incoming flow, were removed.

(b) In step (b), the flow of materials coming from step (a), at least partially separated from the fraction of contaminants, was subjected to separation by aeraulic sorting into two coupled separators (B) and (C).

In the first aeraulic separator (B), the fraction ($b_1$) representing 0.52 tons of so-called light materials to be treated by suction and fractions $b_2$ and $b_3$ extracted from the base of the aeraulic separator (B) and representing 21.84 tons of so-called heavy materials were collected in order to be treated in the aeraulic separator (C). The fraction ($b_1$) represents 2.32% by weight of light materials removed with respect to the incoming stream.

The mixture of fractions ($b_2$)+($b_3$) represents 97.5% by weight of heavy materials.

The mixture of fractions ($b_2$) and ($b_3$) representing 20.84 tons was placed in the second aeraulic sorting separator (C). The fraction ($b_2$) constituted by contaminants such as metals, representing a mass of 2.82 tons, was extracted from the base of the aeraulic separator (C).

The fraction ($b_3$), also extracted from the separator (C), constituted by upgradeable polymer materials, represents a mass of 19.02 tons, i.e. 84.91% by weight with respect to the mass of the stream introduced for preconcentration.

(c) A step of grinding the fraction ($b_3$) of polymer materials to be upgraded, from step (b), with the liberation mesh for separating contaminants included, is carried out in zone (E), and the grinding is performed on a 25-mm screen.

(d) The second step of aeraulic separation by gas stream of the fraction of synthetic polymer materials to be upgraded, from the grinding step (c), is carried out in zone (H), for at least partially removing the fraction of contaminants liberated during the grinding and to extract the fraction of upgradeable materials constituting the desired mixture, preconcentrated in upgradeable materials, still containing contaminants.

This aeraulic separation zone (H), which comprises not only a gas stream separation but also screening means is formed by a modular separation device, such as, for example, that sold by the WESTRUP company.

From this separation zone (H):
a fraction ($d_3$), representing 18.36 tons of upgradeable synthetic polymer materials, was extracted, representing 82% by weight of the total mass of the flow entering the preconcentration phase, a fraction ($d_2$), representing 0.14 tons of heavy contaminants formed by metals and electrical wire parts, was removed by screening, representing 0.63% by weight of the total mass of the stream entering the preconcentration phase, a fraction ($d_1$), representing 0.52 tons of material, also upgradeable, was separated by suction including residual polymer foams, fine rubbers, and thermoplastic and thermosetting polymer materials, representing 2.32% by weight of the total mass of the flow entering the preconcentration phase.

Fraction $d_3$, a mixture of upgradeable used synthetic polymers leaving step (d), but having highly variable densities in an interval ranging from 0.900 to 1.400, is subjected to a density separation treatment in an aqueous medium, in zone (J), at a density threshold $ds \geqq 1.2$ in order to perform a first selection by density.

This separation is achieved by density at the chosen density threshold 1.2 in a dense medium consisting of an aqueous suspension of kaolin powder dispersed in the aqueous phase and stabilised at the value $ds=1.2$ by means of recirculation of said aqueous suspension at a rate of 20 m³/h, the usable capacity of the hydraulic separator being 5 m³.

The dense separation medium comprises:
  an aqueous phase having a conductivity of 6.9 ms and a pH of 7.26,
  kaolin of which the median diametral dimension is 1 µm and of which the granulometric cross-section is 30 µm in an amount of 373.29 g/l,
  the stabilisation of the separating suspension is achieved by recirculating the kaolin suspension at a rate of 20 m³/h, the usable capacity of the hydraulic separator being 5 m³.

This separation at the density threshold $ds=1.2$ enables two fractions to be obtained:
  a first fraction $e_1$ having a density of less than 1.2, representing 17.20 tons of upgradeable material (76.78% by weight of the incoming stream), containing in particular polyethylene (PE), polypropylene (PP), flameproof or non-flameproof high-impact and/or crystal polystyrene (PS), flameproof or non-flameproof acrylonitrile-butadiene-styrene copolymer (ABS), polypropylene filled with 5% to 40% by weight of talc, and other polymer materials, and
  another fraction $e_2$ having a density greater than or equal to 1.2, representing 1.16 tons of upgradeable material (5.18% by weight of the incoming flow), in the form of a mixture including polyvinyl chloride, filled unsaturated polyester, filled polyurethanes or the like.

The fraction $e_1$, a mixture of used polymers to be upgraded, leaving step (J), is subjected to a density separation treatment in an aqueous medium, in zone (L), at the density threshold $ds=1.000$, so as to extract a supernatant flow ($f_1$ which is a mixture of (PE) and (PP) and a running flow ($f_2$) including the other used polymers to be upgraded.

The supernatant flow ($f_1$), which represents 23.50% by weight of the fraction ($e_1$), is subjected to a density separation treatment in a hydroalcoholic medium (water and isopropanol) at the specific density threshold $ds=0.930$ making it possible to recover:
  all of the supernatant polypropylene present, representing 14.76% by weight of the fraction $e_1$ (2.54 T),
  all of the flowing polyethylene present, representing 8.74% by weight of the fraction $e_1$ (1.50 T),
  which two used, finely separated polymer materials can be directly upgraded in the form of granules obtained by their extrusion.

The running flow ($f_2$), which represents 76.50% by weight of the fraction ($e_1$), consisting of a mixture of unfilled flameproof or non-flameproof high-impact and/or crystal polystyrene, an unfilled acrylonitrile-butadiene-styrene copolymer, which for some fractions is flameproof, and polypropylene filled with 5% to 40% talc, constitutes the fraction of the used polymer materials, of which the densities are in an interval ranging from 1.000 to 1.199, bounds included, and which are to be separated according to the invention.

The fraction $f_2$, a mixture of upgradeable used synthetic polymers leaving the separator (L), is subjected to a density separation treatment in an aqueous medium, in zone (N), at a density threshold "ds"=1.100.

This separation is achieved by density at the chosen density threshold 1.100 in a dense medium consisting of an aqueous suspension of kaolin powder dispersed in the aqueous phase and stabilised at the value $ds=1.100$ by means of recirculation of said suspension at a rate of 20 m³/h, the usable capacity of the hydraulic separator being 5 M3.

The dense separation medium comprises:
  an aqueous phase having a conductivity of 6.9 ms and a pH of 7.26,
  kaolin of which the median diametral dimension is 1 µm and of which the granulometric cross-section is 30 µm, in an amount of 174.2 g/liter,
  and is stabilised by recirculation of the suspension by its withdrawal from the base of the separator and its hydraulic reinjection near the surface, at a recirculation flow rate of 20 m³/h.

This separation at the density threshold $ds=1.100$ enables two fractions to be obtained:
  a first fraction $g_1$ having a density of less than 1.100, representing 11.45 tons of upgradeable material (51.12% by weight of the incoming stream), containing in particular polystyrene (PS), acrylonitrile-butadiene-styrene copolymer (ABS), talc-filled polypropylene, and other polymer materials, and
  another fraction $g_2$ having a density greater than or equal to 1.100, representing 1.75 tons of upgradeable material (7.81% by weight of the incoming stream), in the form of a mixture including talc-filled polypropylene, filled and/or flameproof polystyrene, filled and/or flameproof acrylonitrile-butadiene-styrene copolymers (ABS), or other polymer materials.

The stream $g_1$ in fact consists of:
  a mixture of crystal or high-impact polystyrenes, treated or not so as to make them flameproof and/or admixed with various known agents. This is why the density intervals of these various polystyrenes is between 1.000 and 1.080,
  an acrylonitrile-butadiene-styrene copolymer mixture, of which the real density is determined by the relative amounts of the three monomers used, by any admixtures and by the flameproof treatments explaining the density interval of these various ABS, which is between 1.000 and 1.080 as well,
  a talc-filled polypropylene mixture of which the content by weight % of talc can range from 5% to 20%. This is why the density interval of the talc-filled polypropylene is also between 1.000 and 1.080.

This flow $g_1$ is then subjected to separation by increasing density class using a dense separation medium consisting of:
  an aqueous phase having a conductivity of 6.9 ms and a pH of 7.26,
  kaolin powder having a median diametral dimension of 1 µm and of which the granulometric cross-section is 30 µm, of which the weights for each density are shown in table II below,
  means for dynamic stabilisation by recirculation of a suspension volume, at a flow rate of 20 m³/h.

To do this, and in each known density class shown in table IX, the supernatant phase is recovered and analysed, and the sinking phase is collected then subjected to a density higher than the previous one, thereby producing, for each class, an analysed supernatant phase and a sinking phase subjected in turn to a higher density.

TABLE IX

| Density ds established as the separation threshold | Kaolin in g/l powder for creating ds | Limits of each density class | % by weight in each class | | |
|---|---|---|---|---|---|
| | | | PS | ABS | talc PP |
| 1.020 | 33.08 | [1.000 to 1.020[ | 1.25% | 0.60% | 6.40% |
| 1.042 | 70.09 | [1.020 to 1.042[ | 22.30% | 0.00% | 16.50% |
| 1.050 | 83.87 | [1.042 to 1.050[ | 35.55% | 1.60% | 17.15% |
| 1.053 | 89.08 | [1.050 to 1.053[ | 10.08% | 3.25% | 8.05% |
| 1.055 | 92.56 | [1.053 to 1.055[ | 8.25% | 5.65% | 3.10% |
| 1.058 | 97.80 | [1.055 to 1.058[ | 3.95% | 6.35% | 5.25% |
| 1.060 | 101.3 | [1.058 to 1.060[ | 9.05% | 14.40% | 7.60% |
| 1.065 | 110.10 | [1.060 to 1.065[ | 5.62% | 17.10% | 10.35% |
| 1.070 | 118.95 | [1.065 to 1.070[ | 2.75% | 25.80% | 9.30% |
| 1.080 | 136.94 | [1.070 to 1.080[ | 1.20% | 24.25% | 15.90% |
| 1.090 | 154.97 | [1.080 to 1.090[ | 0.00% | 1.00% | 0.40% |
| 1.100 | 173.33 | [1.090 to 1.100[ | 0.00% | 0.00% | 0.00% |
| TOTAL | | | 100.00% | 100.00% | 100.00% |

The amounts of kaolin used in each density class are determined by measuring the density and can vary according to the purity of the kaolin used.

As shown in table IX,

- the PS is primarily present in the density range [1.020-1.055[, constituting a first group related to the crystal PS, but a second density group is seen in the interval [1.055-1.070[ which is related to the high-impact PS, without failing to mention that some PSs present are probably flameproof. These various density classes are statistically justified by the presence of a plurality of PS families in this used polymer to be upgraded;
- the ABS is also distributed among a plurality of density classes, but it is primarily present in the density interval [1.058-1.080[. In the case of ABS, there also appears to be a wide distribution of densities due to the presence of a plurality of types of ABS of which the compositions can vary by the relative amounts of their monomers and also by the presence of flameproof agents;
- the talc PP is also distributed among a plurality of classes by significant variations in density due to the presence of the talc filler, which can range from 5% to 20% by weight.

To perform the effective separation of the PS, ABS and talc PP present in the same density class, the mixture of used polymer materials to be upgraded, extracted from each density class of table II, is subjected to a new separation by increasing or decreasing density in the separation zone (R) by means of a dense separation medium consisting of:

- an aqueous phase having a conductivity of 6.9 ms and a pH of 7.26,
- kaolin powder having a median diametral dimension of 1 μm and of which the granulometric cross-section is 30 μm, and of which the weights are shown in table III below,
- means for dynamic stabilisation by recirculation of a suspension volume, at a flow rate of 20 m³/h.

By way of example, two density separation classes only, from table II, are selected and treated according to the invention, to illustrate the selective separation capability of the method to establish stable separating suspensions with an invariant density, when the density level "ds" is created as the threshold for the separation of various used polymer materials to be separated, wherein the precision level of the density is capable of having an absolute value |0.001|, i.e. is capable of having, near the chosen value "ds", a precision with respect to said "ds" value of ±0.0005.

However, it is noted that used polymers having a different chemical nature but exactly identical densities cannot be separated by the method of the invention and require other separation means based on other criteria.

The two density classes from table II, and treated according to the method of the invention, are the following: [1.042 to 1.050[ and [1.065 to 1.070[.

To do this, and in each known density class shown in table X, the supernatant phase is recovered and analysed, and the sinking phase is collected, then subjected to a density higher than the previous one, thereby producing, for each class, an analysed supernatant phase and a sinking phase subjected in turn to a higher density.

This highly selective separation produced, for each class, the results shown by class in the following table X.

TABLE X

| Density ds established as the separation threshold | Kaolin in g/l powder for creating ds | Limits of each density class | % by weight in each class | | |
|---|---|---|---|---|---|
| | | | PS | ABS | talc PP |
| 1.043 | 72.16 | [1.042 to 1.043[ | 0 | 0 | 0.608 |
| 1.044 | 73.89 | [1.043 to 1.044[ | 0 | 0 | 0.610 |
| 1.045 | 75.62 | [1.044 to 1.045[ | 0 | 0 | 0.754 |
| 1.046 | 77.35 | [1.045 to 1.046[ | 0 | 0 | 1.027 |
| 1.047 | 79.08 | [1.046 to 1.047[ | 0 | 0 | 0.307 |
| 1.048 | 80.81 | [1.047 to 1.048[ | 0 | 0 | 0.920 |
| 1.049 | 82.55 | [1.048 to 1.049[ | 7.12 | 0 | 3.049 |
| 1.050 | 84.29 | [1.049 to 1.050[ | 15.105 | 0 | 9.125 |
| 1.066 | 112.42 | [1.065 to 1.066[ | 1.052 | 0.113 | 6.125 |
| 1.067 | 114.20 | [1.066 to 1.067[ | 0.920 | 0.320 | 1.950 |
| 1.068 | 115.98 | [1.067 to 1.068[ | 1.248 | 0.827 | 1.058 |

TABLE X-continued

| Density ds established as the separation threshold | Kaolin in g/l powder for creating ds | Limits of each density class | % by weight in each class | | |
|---|---|---|---|---|---|
| | | | PS | ABS | talc PP |
| 1.069 | 117.76 | [1.068 to 1.069[ | 1.065 | 5.686 | 0.745 |
| 1.070 | 119.55 | [1.069 to 1.070[ | 1.315 | 10.254 | 0.522 |

As table X shows, the method according to the invention provides excellent control in the selective density separation of the polymer materials present, with a density separation sensitivity of ±0.0005 with respect to the chosen density threshold "ds".

However, polymer materials having the same density but a different composition are present in the initial industrial mixture treated in this example, so that other separation means must be implemented in order to separate, within each fraction of polymers having an identical density, each type of polymer present.

EXAMPLE 5

Corresponds to FIG. 1

According to FIG. 1, a 21.88-ton stream of upgradeable material from the separation of the majority of the various metals to be recovered, consisting of a mixture of used synthetic polymers to be upgraded and contaminants to be eliminated, is subjected to a preconcentration phase so as to select, from this mixture, used polymer materials to be upgraded.

The composition of the stream of materials entering the preconcentration phase corresponds to the data in table I of example 1 and reproduced below.

TABLE XI

| Materials | Composition and granulometry | Content in weight % |
|---|---|---|
| Polymers | PE, PP, PS, ABS, Talc PP, PVC, etc. in fragmented form | 73% by weight |
| Rubber and/or elastomers | All types of joints and/or insulating casings for electrical cables | 19% by weight |
| Metals | Fragments of ferrous, and especially non-ferrous, metals: copper, aluminium, etc. | 8% by weight |

The mixture to be treated, as well as treatment steps (a) to (d), are identical to those of example 1.

From the aeraulic separation and screening zone (G/H) according to step d) and according to example 1:
- a fraction ($d_3$) representing 15.8 tons of upgradeable synthetic polymer materials, essentially thermoplastics and a small amount of thermosetting plastics, was extracted in the form of flakes, chips and other ground material representing 72.2% by weight of the total mass of the stream entering the preconcentration phase,
- a fraction ($d_2$) representing 0.06 tons of heavy contaminants formed by metals and electrical wire parts was removed by screening, representing 0.27% by weight of the total mass of the stream entering the preconcentration phase,
- a fraction ($d_1$) representing 0.32 tons of material, also upgradeable, was separated by suction including residual polymer foams, fine rubbers, thermoplastic and thermosetting polymer materials, in flake powder or chip form, representing 1.46% by weight of the total mass of the stream entering the preconcentration phase.

Fraction $d_3$, a mixture of upgradeable used synthetic polymers leaving step (d), but having highly variable densities in an interval ranging from 0.900 to 1.400, is subjected to a density separation treatment in an aqueous medium, in zone (J), at a density threshold ds≧1.2 in order to perform a first selection by density.

This separation is achieved by flotation at the chosen density threshold 1.2 in a dense medium consisting of an aqueous suspension of $CaCO_3$ powder dispersed in the aqueous phase and stabilised at the value ds=1.2 by means of sequential recirculation of the suspension, that is by alternating 20-s circulation cycles with 20-s pause cycles, withdrawn from the base of the separator and reinjected near the surface at a recirculation flow rate of 2 $m^3$/h.

The dense separation medium comprises:
- an aqueous phase having a conductivity of 5.9 ms and a pH of 7.42,
- calcium carbonate powder of which the median diametral dimension is 1 μm and of which the granulometric cross-section is 5 μm (OMYALITE 90 sold by the OMYA company), in an amount of 362 g/l,
- the stabilisation of the separating suspension is achieved by sequential recirculation of the calcium carbonate suspension at a rate of 2 $m^3$/h, the usable capacity of the hydraulic separator being 5 $m^3$.

This separation at the density threshold ds=1.2 enables two fractions to be obtained (cf. table XII):

TABLE XII

| Fraction | Density | Mass | Composition |
|---|---|---|---|
| $e_1$ | <1.2 | 14.56 tons of upgradeable material, 66.54% by weight of the incoming stream | PE, PP, PS, flameproof or nonflameproof ABS, PP filled with 5 to 40% by weight of talc... |
| $e_2$ | > or =1.2 | 1.24 tons of upgradeable material, 5.67% by weight of the incoming stream | polyvinyl chloride, filled unsaturated polyester, filled polyurethanes or the like. |

Fraction $e_1$, a mixture of used polymers to be upgraded, leaving step (J), is subjected to a density separation treatment in an aqueous medium, in zone (L), at the density threshold ds=1.000, so as to extract a supernatant flow ($f_1$), which is a mixture of (PE) and (PP) and a running flow ($f_2$) including the other used polymers to be upgraded.

The supernatant flow ($f_1$), which represents 3.407 T [23.40% by weight of fraction ($e_1$)], is subjected to a density separation treatment in a hydroalcoholic medium (water and isopropanol) at the specific density threshold ds=0.930 making it possible to recover:
- all of the supernatant polypropylene present (2.146 T), representing 14.74% by weight of the fraction $e_1$,
- all of the flowing polyethylene present (1.261 T), representing 8.66% by weight of the fraction $e_1$, which two used, finely separated polymer materials can be directly upgraded in the form of granules obtained by their extension.

The running flow ($f_2$), which represents 11.153 T [76.60% by weight of the fraction ($e_1$)], consisting of a mixture of unfilled flameproof or non-flameproof high-impact and/or crystal polystyrene, an unfilled acrylonitrile-butadiene-styrene copolymer, which for some fractions is flameproof, and polypropylene filled with 5% to 40% talc, constitutes the fraction of the used polymer materials, of which the densities are in an interval ranging from 1.000 to 1.199, bounds included, and which are to be separated according to the invention.

The fraction $f_2$, a mixture of upgradeable used synthetic polymers leaving the separator (L) is subjected to a density separation treatment in an aqueous medium, in zone (N), at a density threshold "ds"=1.100.

This separation is achieved by density at the chosen density threshold 1.100 in a dense medium consisting of an aqueous suspension of $CaCO_3$ powder dispersed in the aqueous phase and stabilised at the value ds=1.100 by means of sequential recirculation of the suspension, i.e. by alternating 20-s circulation cycles with 20-s pause cycles, at a rate of 2 $m^3/h$.

The dense separation medium comprises:

an aqueous phase having a conductivity of 5.9 ms and a pH of 7.42, calcium carbonate powder of which the median diametral dimension is 1 μm and of which the granulometric cross-section is 5 μm (OMYALITE 90 sold by the OMYA company), in an amount of 187.7 g/l and is stabilised by sequential recirculation of the suspension by its withdrawal from the base of the separator and its hydraulic reinjection near the surface, at a recirculation flow rate of 2 $m^3/h$.

This separation at the density threshold ds=1.100 enables two fractions to be obtained (cf. table XIII):

TABLE XIII

| Fraction | Density | Mass | Composition |
|---|---|---|---|
| $g_1$ | <1.1 | 10.762 tons of upgradeable material, 49.19% by weight of the incoming stream | PS, ABS, talc-filled PP and other polymer materials... |
| $g_2$ | > or =1.1 | 0.381 tons of upgradeable material, 1.74% by weight of the incoming stream | PC, PP filled with 30 to 40% talc, PVC, PMMA, filled PU or the like... |

The stream $g_1$ in fact consists of:

a mixture of crystal or high-impact polystyrenes, treated or not so as to make them flameproof and/or admixed with various known agents. This is why the density intervals of these various polystyrenes is between 1.000 and 1.080, an acrylonitrile-butadiene-styrene copolymer mixture, of which the real density is determined by the relative amounts of the three monomers used, by any admixtures and by the flameproof treatments explaining the density interval of these various ABS, which is between 1.000 and 1.080 as well, a talc-filled polypropylene mixture of which the content by weight % of talc can range from 5% to 20%. This is why the density interval of the talc-filled polypropylene is also between 1.000 and 1.080.

This stream $g_1$ is then subjected to separation in zone (P) by increasing density class using a dense separation medium consisting of:

an aqueous phase having a conductivity of 5.7 ms and a pH of 7.53, calcium carbonate powder having a median diametral dimension of 1 μm and of which the granulometric cross-section is 5 μm (OMYALITE 90 sold by the OMYA company), of which the weights for each density are shown in table II below, means for dynamic stabilisation by sequential recirculation of a suspension volume, at a flow rate of 2 $m^3/h$.

To do this, and in each known density class shown in table XIV, the supernatant phase is recovered and analysed, and the sinking phase is collected then subjected to a density higher than the previous one, thereby producing, for each class, an analysed supernatant phase and a sinking phase subjected in turn to a higher density.

TABLE XIV

Treatment of stream g1

| Density ds established as the separation threshold | $CaCo_3$ in g/l powder for creating ds | Limits of each density class | Stabilisation means: flow in $m^3/h$ | % by weight in each class | | |
|---|---|---|---|---|---|---|
| | | | | PS | ABS | talc PP |
| 1.020 | 32.30 | [1.000 to 1.020[ | 2 | 1.10% | 0.30% | 5.15% |
| 1.042 | 68.75 | [1.020 to 1.042[ | 2 | 22.01% | 0.10% | 16.39% |
| 1.05 | 82.2 | [1.042 to 1.050[ | 2 | 36.19% | 1.31% | 18.50% |
| 1.053 | 87.3 | [1.050 to 1.053[ | 2 | 10.21% | 3.10% | 7.94% |
| 1.055 | 90.7 | [1.053 to 1.055[ | 2 | 8.10% | 5.40% | 2.90% |
| 1.058 | 95.8 | [1.055 to 1.058[ | 2 | 3.50% | 6.50% | 5.50% |
| 1.06 | 99.2 | [1.058 to 1.060[ | 2 | 9.29% | 14.59% | 7.62% |
| 1.065 | 107.8 | [1.060 to 1.065[ | 2 | 6.10% | 17.30% | 9.10% |
| 1.07 | 116.50 | [1.065 to 1.070[ | 2 | 2.50% | 25.60% | 9.00% |
| 1.08 | 134.00 | [1.070 to 1.080[ | 2 | 1.00% | 24.60% | 17.50% |
| 1.09 | 151.70 | [1.080 to 1.090[ | 2 | 0% | 1.10% | 0.30% |
| 1.100 | 169.50 | [1.090 to 1.100[ | 2 | 0% | 0.10% | 0.10% |
| TOTAL | | | | 100.00% | 100.00% | 100.00% |

As shown in table XIV, the PS is primarily present in the density range [1.020-1.055[, constituting a first group related to the crystal PS, but a second density group is seen in the interval [1.055-1.070[ which is related to the high-impact PS, without failing to mention that some PSs present are probably flameproof. These various density classes are statistically justified by the presence of a plurality of PS families in this used polymer to be upgraded;

the ABS is also distributed among a plurality of density classes, but it is primarily present in the density interval [1.058-1.080[. In the case of ABS, there also appears to be a wide distribution of densities due to the presence of a plurality of types of ABS of which the compositions can vary by the relative amounts of their monomers and also by the presence of flameproof agents;

the talc PP is also distributed among a plurality of classes by significant variations in density due to the presence of the talc filler, which can range from 5% to 20% by weight.

To perform the effective separation of the PS, ABS and talc PP present in the same density class, the mixture of used polymer materials to be upgraded, extracted from each density class of table XIV, is subjected to a new separation by increasing or decreasing density in the separation zone (R) by means of a dense separation medium consisting of:

an aqueous phase having a conductivity of 6.8 ms and a pH of 8.1, calcium carbonate powder having a median diametral dimension of 1 μm and of which the granulometric cross-section is 5 μm (OMYALITE 90 sold by the OMYA company), and of which the weights are shown in table III below, means for dynamic stabilisation by sequential recirculation of a suspension volume, at a flow rate of 2 m³/h.

By way of example, two density separation classes only, from table II, are selected and treated according to the invention, to illustrate the selective separation capability of the method to establish stable separating suspensions with an invariant density, when the density level "ds" is created as the threshold for the separation of various used polymer materials to be separated, wherein the precision level of the density is capable of having an absolute value |0.001|, i.e. is capable of having, near the chosen value "ds", a precision with respect to said "ds" value of ±0005.

The two density classes from table XIV, and treated according to the method of the invention, are the following: [1.042 to 1.050[ and [1.065 to 1.070[.

This highly selective separation produced, for each class, the results shown by class in the following table XV:

TABLE XV

Treatment of two density classes from stream g1.

| Density ds established as the separation threshold | CaCo₃ in g/l powder for creating ds | Limits of each density class | % by weight in each class | | |
|---|---|---|---|---|---|
| | | | PS | ABS | talc PP |
| 1.043 | 70.4 | [1.042 to 1.043[ | 0 | 0 | 0.32 |
| 1.044 | 72.8 | [1.043 to 1.044[ | 0 | 0 | 0.35 |
| 1.045 | 74.5 | [1.044 to 1.045[ | 0 | 0 | 0.52 |

TABLE XV-continued

Treatment of two density classes from stream g1.

| Density ds established as the separation threshold | CaCo₃ in g/l powder for creating ds | Limits of each density class | % by weight in each class | | |
|---|---|---|---|---|---|
| | | | PS | ABS | talc PP |
| 1.046 | 76.2 | [1.045 to 1.046[ | 0 | 0 | 0.49 |
| 1.047 | 77.2 | [1.046 to 1.047[ | 0 | 0 | 0.32 |
| 1.048 | 78.8 | [1.047 to 1.048[ | 0 | 0 | 0.55 |
| 1.049 | 80.5 | [1.048 to 1.049[ | 6.45 | 0 | 4.05 |
| 1.05 | 82.2 | [1.049 to 1.050[ | 15.55 | 0.1 | 9.8 |
| 1.066 | 109.6 | [1.065 to 1.066[ | 0.92 | 0.08 | 6.67 |
| 1.067 | 113.3 | [1.066 to 1.067[ | 0.75 | 0.28 | 0.85 |
| 1.068 | 113.0 | [1.067 to 1.068[ | 1.04 | 0.79 | 0.69 |
| 1.069 | 114.7 | [1.068 to 1.069[ | 2.16 | 5.79 | 0.51 |
| 1.07 | 116.5 | [1.069 to 1.070[ | 1.23 | 10.36 | 0.38 |

As table XV shows, the method according to the invention provides excellent control in the selective density separation of the polymer materials present, with a density separation sensitivity of ±0.0005 with respect to the chosen density threshold "ds".

However, polymer materials having the same density but a different composition are present in the initial industrial mixture treated in this example, so that other separation means must be implemented in order to separate, within each fraction of polymers having an identical density, each type of polymer present.

The other fraction $g_2$ having a density greater than 1.100, representing 0.381 tons of upgradeable material including a mixture of polycarbonate (PC), talc-filled polypropylene (PP), polyvinyl chloride (PVC), polymethyl methacrylates (PMMA) and filled polyurethanes (PU), is treated according to the same principle as fraction $g_1$, in separation zones (Q) and (S), not described.

The invention claimed is:

1. Method for selective separation of each of the constituents of a mixture of synthetic organic materials that are polymers and/or copolymers, intended to be upgraded by recycling, having a density of at least 1, in fragmented form, comprising carrying out their separation by introducing said mixture into a dense liquid medium, which is an aqueous suspension of powder particles dispersed in an adequate amount in an aqueous phase, in order to create a density level chosen as the threshold for separation of the various fragmented synthetic organic materials to be selectively separated by type, wherein said separating suspension is made selective, stable and invariant with regard to density at a precision level of ±0.0005 with respect to the density level threshold chosen for the selective separation:

a) by the size selection of powder particles having a granulometric cross-section of no more than 5 μm, which solid powder particles thus sized are dispersed and present in an aqueous phase in a sufficient amount to reach the chosen density level threshold, and b) by the implementation of at least one means of dynamic stabilisation by creating a circulating flow of said separating suspension, which circulating flow is at most 40 m³/h.

2. Method according to claim 1, wherein the powder particles have a median diameter between 1 μm and 0.005 μm.

3. Method according to claim 1, wherein the powder particles are of natural origin and are selected from the group of powder mineral materials consisting of clays belonging to the families formed by the group of kaolinites, the group of micas, the group of montmorillonites, the group of vermiculites, the group of interstratified clays of which the unitary structure is a combination of the previous groups, the group of fibrous clays, the group formed by calcium carbonate, magnesium carbonate, dolomite, calcium sulphate dihydrate, barium sulphate, talc, alumina, silica, titanium dioxide and zirconium.

4. Method according to claim 1, wherein the powder particles are of synthetic origin and are selected from the group consisting of glass powders, calcium carbonate precipitate and metallic powders.

5. Method according to claim 1, wherein the means of dynamic stabilization are selected from the group consisting of agitation by means of an agitation rotor, internal recirculation of the suspension by means of the agitation rotor, external recirculation of the suspension by means of a pump by withdrawing the suspension from the base of the container where it is located and by reinjection into the upper portion of said container, and a combination of means enabling both the agitation by means of an agitation rotor and the internal and/or external recirculation of the suspension.

6. Method according to claim 1, wherein the means of dynamic stabilisation comprise continuous or non-continuous recirculation of the suspension.

7. Method according to claim 1, wherein the circulating flow of the separating suspension is between 5 and 30 m³/h.

8. Method according to claim 1, wherein the circulating flow of the separating suspension is adjusted at an hourly turnover rate of said suspension between 0.5 and 4.

9. Method according to claim 1, wherein the aqueous phase has a conductivity of no more than 50 ms.

10. Method according to claim 1, wherein a water-soluble agent for assisting with the stabilization of the rheological and invariance characteristics of the density level threshold of the solid powder particle suspension is added to said suspension.

11. Method according to claim 10, wherein the water-soluble agent for assisting with the stabilization of the rheological and invariance characteristics of the density level threshold of the solid powder particle suspension is selected from the group consisting of phosphates and polyphosphates, alkylphosphate esters, alkylphosphonate, alkylsulphate, alkylsulfonate, lignin, lignosulfonates in the form of calcium, sodium, iron, chromium, or iron and chromium salts, maleic anhydride and sulfonic styrene acid copolymers, substituted, neutralised, esterified or non-esterified methylacrylamide and (methyl)acrylic acid copolymers, methylacrylamide-alkyl sulfonic acid and (methyl)acrylamide copolymers, water-soluble acrylic acid polymers used in acid form or, optionally, entirely or partially neutralised by alkaline and/or alkaline-earth agents, by amines and/or salified by monovalent and/or polyvalent ions, and/or esterified, and water-soluble acrylic copolymers having phosphatized, phosphonated, sulfated or sulfonated functions.

12. Method according to claim 10, wherein the water-soluble stabilisation agent is selected from the water-soluble acrylic copolymers, having the general formula:

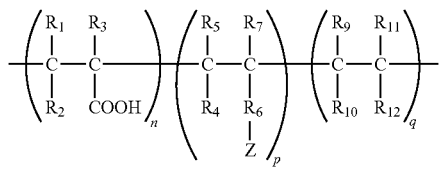

wherein
Z is a phosphate, phosphonate, sulfate or sulfonate motif having at least one free acid function,
n has a value between 0 and 95,
p has a value between 95 and 5,
q has a value between 0 and 95,
the sum of n+p+q is equal to 100,
$R_1$ and $R_2$ can simultaneously be hydrogen, or while one is hydrogen, the other can be a carboxylic function esterified or not by an alcohol in $C_1$ to $C_{12}$,
$R_3$ can be hydrogen or an alkyl radical in $C_1$ to $C_{12}$,
$R_4$ and $R_5$ are, simultaneously or not, hydrogen or an alkyl radical in $C_1$ to $C_{12}$, a substituted or unsubstituted aryl, a carboxylic function esterified or not by an alcohol in $C_1$ to $C_{12}$,
$R_6$ is a radical that establishes the bond between the motif Z and the polymer chain, which radical $R_6$ can be an alkylene of formula $-(CH_2)_r$ in which r can have the values in the interval 1 to 12, an alkylene oxide or polyoxide of formula $-(R_8-O)_s$, in which $R_8$ is an alkylene in $C_1$ to $C_4$ and s can have a value from 1 to 30, or a combination of the two formulas $-(CH_2)_r$ and $-(R_8-O)_s$,
$R_7$ is hydrogen or an alkyl radical in $C_1$ to $C_{12}$,
when n=0, one of $R_9$ and $R_{10}$ are hydrogen and the other is a carboxylic group, and when n≠0, $R_9$ and $R_{10}$ are simultaneously hydrogen, or while one is hydrogen, the other is a carboxylic grouping, an ester in $C_1$ to $C_{12}$, an alkyl in $C_1$ to $C_{12}$, or an alkylaryl,
$R_{11}$ is hydrogen, a carboxylic grouping, an alkyl in $C_1$ to $C_3$ or a halogen,
$R_{12}$ is an ester in $C_1$ to $C_{12}$, a substituted or unsubstituted amide, an alkyl in $C_1$ to $C_{12}$, an aryl in $C_5$ or $C_6$, an alkylaryl, a halogen, a carboxylic grouping or a phosphatized, phosphorated, sulfated or sulfonated alkyl or aryl grouping.

13. Method according to claim 12, wherein Z comprises a cation, an ammonium grouping, an amine, an alkyl in $C_1$ to $C_3$, a substituted or an unsubstituted aryl in $C_3$ to $C_6$, an alkylaryl, an ester in $C_1$ to $C_{12}$, or a substituted amide.

14. Method according to claim 12, wherein, in the sum of n+p+q, n=0, when q>0, and q=0 when n>0.

15. Method according to claim 12, wherein $R_1$ and $R_2$ are a $C_1$ to $C_4$ alcohol esterifying a carboxylic function.

16. Method according to claim 12, wherein $R_3$, is a $C_1$ to $C_4$ alkyl radical.

17. Method according to claim 12, wherein $R_4$ and $R_5$ are $C_1$ to $C_4$ alkyl radicals.

18. Method according to claim 12, wherein $R_4$ and $R_5$ are $C_1$ to $C_4$ alcohols esterifying a carboxylic function.

19. Method according to claim 12, wherein $R_7$ is a $C_1$ to $C_4$ alkyl radical.

20. Method according to claim 12, wherein $R_9$ and $R_{10}$ are $C_1$ to $C_3$ esters.

21. Method according to claim 12, wherein $R_9$ and $R_{10}$ are $C_1$ to $C_3$ alkyl.

22. Method according to claim 12, wherein $R_{12}$ is a $C_1$ to $C_5$ ester.

23. Method according to claim 12, wherein $R_{12}$ is a $C_1$ to $C_3$ alkyl.

24. Method according to claim 12, wherein the molecular weight of the water-soluble acrylic copolymers forming the stabilisation agent is from 5000 to 100,000.

25. Method according to claim 12, wherein the water-soluble acrylic copolymers forming the stabilisation agent are at least partially neutralised, by means of a neutralisation agent selected from the group consisting of sodium, potassium, ammonium, calcium and magnesium hydroxides, and primary, secondary and tertiary amines, aliphatic and/or cyclic, mono-, di- and tri-ethanolamines, mono- and diethylamines, cyclohexylamine and methylcyclohexylamine.

26. Method according to claim 10 or 11, wherein the weight of the water-soluble stabilisation agent, expressed as a dry/dry weight percent of said agent with respect to the weight of the powder particles in suspension, is from 0.02% to 5%.

27. Method according to claim 1, wherein said method is performed in at least one hydraulic separator equipped with at least one dynamic stabilisation means.

28. Method according to claim 27, wherein when said method is performed in a single hydraulic separator, the chosen density level threshold changes:
- in the increasing direction, by a controlled addition of predefined and selected powder particles to the suspension present in the hydraulic separator, until the new chosen threshold density is reached,
- in the decreasing direction, by adding water until the new chosen threshold density is reached.

29. Method according to claim 28, wherein the change in density of the stable separating suspension, in an increasing or decreasing direction, is carried out under agitation by means of an agitation rotor and/or internal recirculation of the aqueous medium and/or recirculation of the dense medium by withdrawing the dense aqueous medium from the base of the hydraulic separator and reinjecting it into the top portion of said separator of the dense aqueous medium being adjusted.

30. Method according to claim 27, wherein, if said method is performed in a plurality of hydraulic separators, the various separators are placed one after another, in a cascade system functioning with stable suspensions each having a specific density threshold, in an increasing or decreasing order of density.

31. Method according to claim 27, wherein the threshold density level of the aqueous suspension for fine separation is continuously controlled by appropriate measurement means and subjected to an adjustment when any deviation is detected.

32. Method according to claim 31, wherein each hydraulic separator is controlled with regard to the density of the dense medium that each separator contains by means of two electrical valves each opening onto two circuits connected to two tanks, one of the tanks containing a mother suspension with a concentration of about 60% powder particles, stabilised by a water-soluble stabilizing agent, enabling a predetermined amount of the mother suspension to be added, which adjusts upward any deviation toward a reduction in the density of the dense medium for fine separation, and the other tank containing water enabling a predetermined amount to be added so as to adjust downward any deviation toward an increase in the density of the dense medium for fine separation.

33. Method according to claim 32, wherein, in each hydraulic separator, the measurement of the density of the dense medium is performed continuously by at least one measuring apparatus that activates the opening of one or the other of the electrical valves, then the closing thereof when the threshold density level is reached.

34. A method for selective separation of a mixture of polymer materials obtained from the destruction of automobiles and/or durable consumer goods that have reached the end of their serviceable lives comprising implementing the method of claim 1.

* * * * *